United States Patent
Thesling

(10) Patent No.: US 7,986,624 B2
(45) Date of Patent: Jul. 26, 2011

(54) QUALITY OF SERVICE ENHANCEMENTS FOR ADAPTIVE CODING AND MODULATION

(75) Inventor: William H. Thesling, Hudson, OH (US)

(73) Assignee: ViaSat, Inc., Carlsbad, CA (US)

( * ) Notice: Subject to any disclaimer, the term of this patent is extended or adjusted under 35 U.S.C. 154(b) by 810 days.

(21) Appl. No.: 12/044,681

(22) Filed: Mar. 7, 2008

(65) Prior Publication Data

US 2008/0212517 A1 Sep. 4, 2008

Related U.S. Application Data

(63) Continuation-in-part of application No. 11/554,206, filed on Oct. 30, 2006, now Pat. No. 7,680,040.

(60) Provisional application No. 60/731,122, filed on Oct. 28, 2005.

(51) Int. Cl.
  *H04L 12/26* (2006.01)
(52) U.S. Cl. ..................... 370/230.1; 370/235
(58) Field of Classification Search .......... 370/229, 370/230, 230.1, 232, 235, 301, 314, 330, 370/395.4, 458, 468, 503, 519; 455/464; 709/232, 233, 235
  See application file for complete search history.

(56) References Cited

U.S. PATENT DOCUMENTS

| | | | |
|---|---|---|---|
| 4,819,629 A | 4/1989 | Jonson | |
| 5,517,495 A * | 5/1996 | Lund et al. | 370/399 |
| 5,586,550 A | 12/1996 | Ivri et al. | |
| 5,914,946 A | 6/1999 | Avidor et al. | |
| 5,917,900 A | 6/1999 | Allison et al. | |
| 5,991,812 A * | 11/1999 | Srinivasan | 709/232 |
| 6,122,280 A | 9/2000 | Hamai et al. | |
| 6,138,012 A | 10/2000 | Krutz et al. | |
| 6,385,462 B1 | 5/2002 | Baum et al. | |
| 6,701,129 B1 | 3/2004 | Hashem et al. | |
| 6,765,921 B1 | 7/2004 | Stacey et al. | |
| 6,804,211 B1 | 10/2004 | Klein et al. | |
| 6,885,657 B1 | 4/2005 | Rabenko et al. | |
| 6,990,529 B2 * | 1/2006 | Yang et al. | 709/235 |
| 7,043,210 B2 | 5/2006 | Zhu et al. | |
| 7,126,996 B2 | 10/2006 | Classon et al. | |

(Continued)

FOREIGN PATENT DOCUMENTS

FR 2783431 A1 9/1998

(Continued)

OTHER PUBLICATIONS

U.S. Appl. No. 11/554,226, Office Action dated Jan. 23, 2009, 17 pages.

(Continued)

*Primary Examiner* — Kwang B Yao
*Assistant Examiner* — Andrew Lai
(74) *Attorney, Agent, or Firm* — Kilpatrick Townsend & Stockton LLP

(57) ABSTRACT

A process is described to build frames for transmission with a modcode adapted to the signal quality of a destination terminal. The order of transmission may be based, at least in part, on the age of a packet as defined by a timestamp. Data packets assigned to the same modcode may be grouped in the same frame, with precedence given to older timestamps. For data packets with certain quality of service designations, timestamps may be modified to expedite forwarding. The amount of modification may, for example, be based on factors related to delay and latency.

24 Claims, 13 Drawing Sheets

U.S. PATENT DOCUMENTS

| | | | |
|---|---|---|---|
| 7,319,669 | B1 | 1/2008 | Kunz et al. |
| 7,450,602 | B2 | 11/2008 | Vazquez Castro |
| 7,567,504 | B2 | 7/2009 | Darling et al. |
| 7,680,040 | B2 * | 3/2010 | Thesling ............ 370/230 |
| 2002/0036992 | A1 | 3/2002 | Balachandran et al. |
| 2002/0097750 | A1 * | 7/2002 | Gunaseelan et al. ....... 370/503 |
| 2002/0118666 | A1 | 8/2002 | Stanwood et al. |
| 2002/0131441 | A1 | 9/2002 | Trachewsky et al. |
| 2002/0150115 | A1 | 10/2002 | Onvural et al. |
| 2002/0183020 | A1 | 12/2002 | Zhu et al. |
| 2003/0045307 | A1 * | 3/2003 | Arviv et al. ............ 455/464 |
| 2003/0054816 | A1 | 3/2003 | Krebs et al. |
| 2003/0110435 | A1 | 6/2003 | Wu et al. |
| 2003/0121030 | A1 | 6/2003 | Koob et al. |
| 2003/0176161 | A1 | 9/2003 | Dale et al. |
| 2003/0206559 | A1 | 11/2003 | Trachewsky et al. |
| 2004/0001493 | A1 | 1/2004 | Cloonan et al. |
| 2004/0085976 | A1 | 5/2004 | Dale et al. |
| 2004/0100941 | A1 | 5/2004 | Lim et al. |
| 2004/0120474 | A1 | 6/2004 | Lopponen et al. |
| 2004/0141601 | A1 | 7/2004 | Cai et al. |
| 2004/0208121 | A1 * | 10/2004 | Gin et al. ............ 370/230 |
| 2004/0247122 | A1 | 12/2004 | Hobrock et al. |
| 2005/0013593 | A1 * | 1/2005 | Jung et al. ............ 386/98 |
| 2005/0058098 | A1 | 3/2005 | Klein et al. |
| 2005/0060760 | A1 | 3/2005 | Jaffe et al. |
| 2005/0138521 | A1 | 6/2005 | Suzuki et al. |
| 2005/0147034 | A1 | 7/2005 | Zhao et al. |
| 2005/0213587 | A1 | 9/2005 | Cho et al. |
| 2006/0067325 | A1 | 3/2006 | Kounavis et al. |
| 2006/0104299 | A1 | 5/2006 | Vazquez |
| 2006/0126576 | A1 | 6/2006 | Dale et al. |
| 2007/0110098 | A1 | 5/2007 | Hart et al. |
| 2007/0116152 | A1 | 5/2007 | Thesling |
| 2007/0206525 | A1 | 9/2007 | Miller et al. |
| 2007/0271388 | A1 | 11/2007 | Bowra et al. |
| 2008/0144493 | A1 | 6/2008 | Yeh |
| 2009/0028187 | A1 | 1/2009 | Dale et al. |
| 2009/0052323 | A1 | 2/2009 | Breynaert et al. |

FOREIGN PATENT DOCUMENTS

| | | |
|---|---|---|
| WO | WO 01/10046 A2 | 2/2001 |
| WO | WO 03/019805 A1 | 3/2003 |

OTHER PUBLICATIONS

International Search Report, mailed Jan. 15, 2009, International Application No. PCT/US08/86014, filed Dec. 9, 2008, 2 pages.

A. Morello et al., "New DVB Standard for DSNG—and Contribution Satellite Links", Sep. 21, 1998, pp. 31-45, EBU Technical Review, European Broadcasting Union, Brussels, BE, No. 277.

International Search Report and Written Opinion of the International Searching Authority, dated May 31, 2007 corresponding to PCT International Application No. PCT/US2006/043258, filed Oct. 30, 2006.

U.S. Appl. No. 11/554,244, Office Action dated Mar. 13, 2009, 34 pages.

Office Action, U.S. Appl. No. 11/554,206, dated Jun. 18, 2009, 17 pages.

Office Action dated Jul. 9, 2009, U.S. Appl. No. 11/554,226, 29 pages.

U.S. Appl. No. 11/554,263, Office Action dated Sep. 4, 2009, 21 pages.

U.S. Appl. No. 11/554,244, Notice of Allowance mailed Oct. 20, 2009, 8 pages.

* cited by examiner

| QoS | Delay Since Transmission | Latency at Gateway | Load at Gateway |
|---|---|---|---|
| A | $X_A$ | | $Z_A$ |
| B | $X_B$ | | $Z_B$ |
| C | $X_C$ | | $Z_C$ |
| D | $X_D$ | | $Z_D$ |
| E | | $Y_N$ | $Z_E$ |
| F | $X_E$ | $Y_N$ | $Z_F$ |
| G | $X_F$ | $Y_N$ | $Z_G$ |
| H | $X_H$ | $Y_N$ | $Z_H$ |
| I | $X_I$ | $Y_N$ | $Z_I$ |
| J | | $Y_N$ | $Z_J$ |
| K | $X_K$ | $Y_N$ | $Z_K$ |

QUALITY OF SERVICE ENHANCEMENTS FOR ADAPTIVE CODING AND MODULATION

CROSS-REFERENCE TO RELATED APPLICATIONS

This application is a continuation-in part from U.S. patent application Ser. No. 11/554,206, now U.S. Pat. No. 7,680,040, filed Oct. 30, 2006, entitled "ADAPTIVE CODING AND MODULATION FOR BROADBAND DATA TRANSMISSION", which claims priority from U.S. Provisional Patent Application No. 60/731,122, filed Oct. 28, 2005, entitled "ADAPTIVE CODING AND MODULATION FOR BROADBAND DATA TRANSMISSION," each of which is hereby incorporated by reference, as if set forth in full in this document, for all purposes.

This application is related to the following U.S. patent applications: U.S. patent application Ser. No. 11/554,226, filed Oct. 30, 2006, entitled "ADAPTIVE CODING AND MODULATION QUEUING METHODS AND DEVICES"; U.S. patent application Ser. No. 11/554,244, filed Oct. 30, 2006, entitled "ADAPTIVE CODING AND MODULATION USING LINKED LIST DATA STRUCTURES"; and U.S. patent application Ser. No. 11/554,263, filed Oct. 30, 2006, entitled "ADAPTIVE CODING AND MODULATION FLOW CONTROL AND TRAFFIC SHAPING METHODS AND DEVICES". This application hereby incorporates by reference herein the content of each of the aforementioned applications in their entirety and for all purposes.

BACKGROUND OF THE INVENTION

The present invention relates to wireless communications in general and, in particular, to certain quality of service enhancements.

Bi-directional wireless systems (such as satellite) may benefit from the use of adaptive coding and modulation ("ACM"). Using ACM, the modulation format and Forward Error Correction ("FEC") codes for a signal may be adapted to better match the link conditions for each user in a multi-user system. A return channel or other means may be used to report the conditions of a receiving terminal. These link conditions are often characterized by the individual user's (or terminal's) signal-to-noise ratio ("SNR"). In a broadcast system, for example, the waveform broadcast to a number of users includes data packets designated only for an individual terminal (or small group of terminals). A message transmitted to a user requires fewer symbols (and thus less time) when a higher order modulation and higher code rate is used. Lower order modulation and lower code rate are more reliable but require more time to transmit the same size message. Using ACM, each packet may be transmitted at an optimized modulation and coding ("modcode") level given the destination terminal's link conditions.

In optimizing modcode levels for a destination terminal's link conditions, first-in first-out (FIFO) queueing may be used in traditional systems. However, different sets of data may have different quality of service requirements. It may, therefore, be desirable to have novel techniques for providing certain sets of data with forwarding preferences, while still implementing efficient traffic shaping and allocation using adaptive coding and modulation.

BRIEF SUMMARY OF THE INVENTION

Systems, methods, devices, and processors are described to modify timestamps of data packets based on quality of service designations to thereby change encapsulation and transmission ordering. The amount of timestamp modification may be based on the quality of service designation, the age of the data packet, latency at the gateway, and other factors.

In some embodiments, physical layer frames are built with a modcode adapted to the signal quality of a destination terminal, and timestamp modification may change the order in which packets associated with the same modcode are processed. Data packets assigned to the same modcode are generally sent in the same frame, although packets associated with higher modcodes may be used to complete a frame before switching to the applicable higher modcode for construction of subsequent frames. After certain time intervals, an order of progression is restarted at an out of order packet including a timestamp modified to be above a threshold age to thereby trigger expedited transmission.

In one set of embodiments, packet forwarding queues are used to control the flow of packets according to modcode. Each queue is assigned to a different modcode, and is thereby associated with a signal quality range. Packets are placed into a queue associated with a signal quality range encompassing the link to which the packet is destined. In another set of embodiments, packets are associated with elements of a linked list. In such embodiments, the flow of packets is controlled by iterating through the linked list to identify packets within select signal quality ranges. Various device and system configurations are described to implement the processes set forth above, as well.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 2C illustrates an example of a timestamp modification table that may be used according to various embodiments of the present invention.

DETAILED DESCRIPTION OF THE INVENTION

This description provides exemplary embodiments only, and is not intended to limit the scope, applicability or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that in alternative embodiments, the methods may be performed in an order different than that described, and that various steps may be added, omitted, or combined. Also, features described with respect to certain embodiments may be combined in various other embodiments. Different aspects and elements of the embodiments may be combined in a similar manner.

It should also be appreciated that the following systems, methods, and software may individually or collectively be components of a larger system, wherein other procedures may take precedence over or otherwise modify their application. Also, a number of steps may be required before, after, or concurrently with the following embodiments.

Figure 1:
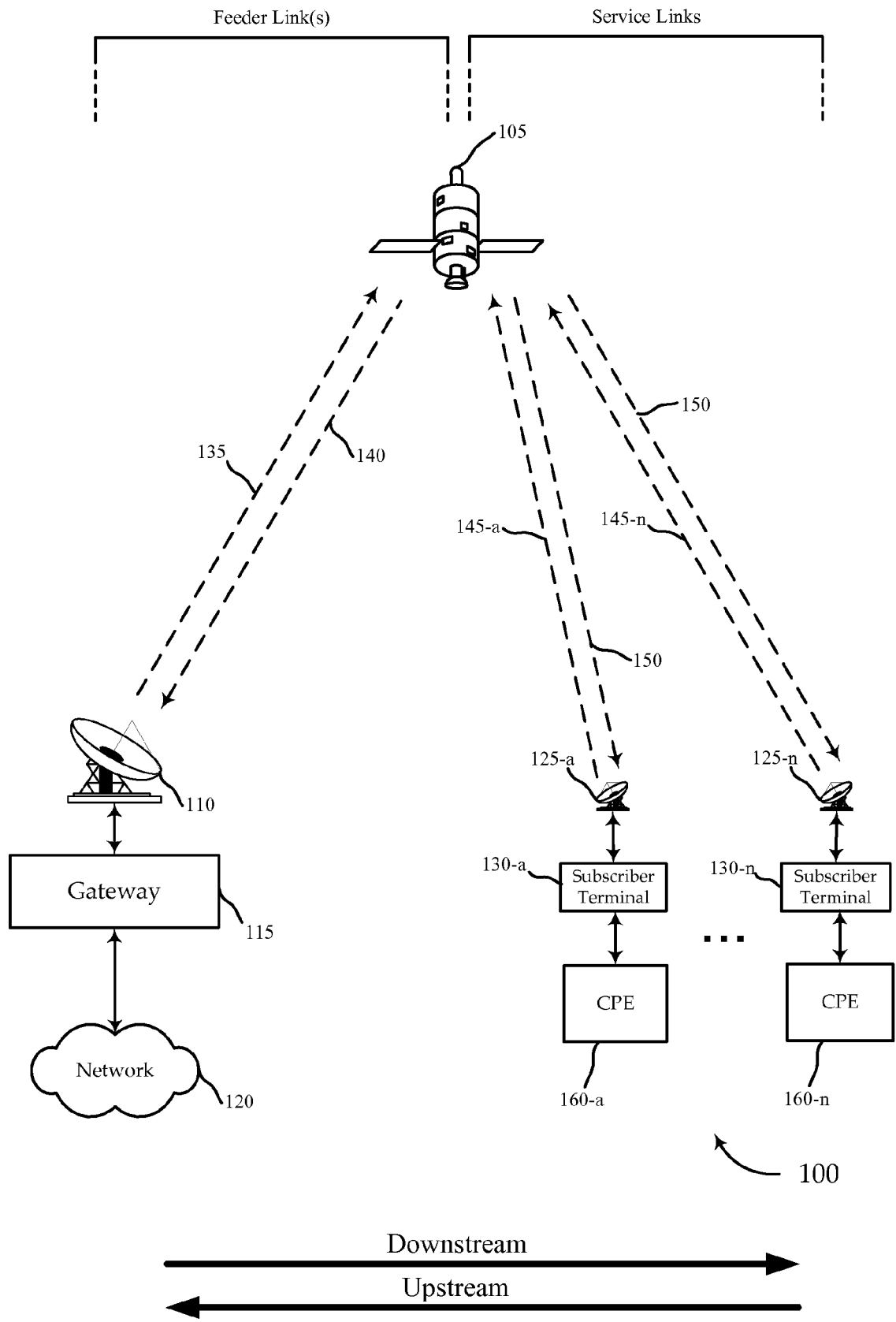
FIG. 1 illustrates a satellite communications system in which adaptive coding and modulation ("ACM") may be implemented according to various embodiments of the present invention.

Referring first to FIG. 1, a block diagram illustrates an example satellite communications system 100 configured according to various embodiments of the invention. While a satellite communications system is used to illustrate various aspects of the invention, it is worth noting that certain principles set forth herein are applicable to a number of other wireless systems, as well. The satellite communications system 100 includes a network 120, such as the Internet, interfaced with a gateway 115 that is configured to communicate with one or more subscriber terminals 130, via a satellite 105.

The network 120 may be any type of network and can include, for example, the Internet, an IP network, an intranet, a wide-area network (WAN), a local-area network (LAN), a virtual private network (VPN), the Public Switched Telephone Network (PSTN), or any other type of network supporting data communication between any devices described herein. A network 120 may include both wired and wireless connections, including optical links. Many other examples are possible and apparent to those skilled in the art in light of this disclosure. The network may connect the gateway 115 with other gateways (not pictured), which are also in communication with the satellite 105, and which may share information on link conditions and other network metrics.

The gateway 115 provides an interface between the network 120 and the subscriber terminal 130. The gateway 115 may be configured to receive data and information directed to one or more subscriber terminals 130, and format the data and information (e.g., using Adaptive Coding and Modulation (ACM)) for delivery downstream to the respective subscriber terminals 130 via the satellite 105. Similarly, the gateway 115 may be configured to receive upstream signals from the satellite 105 (e.g., from one or more subscriber terminals 130) directed to a destination in the network 120, and can format the received signals for transmission through the network 120.

A device (not shown) connected to the network 120 may, therefore, communicate with one or more subscriber terminals 130 through the gateway 115. Data and information, for example IP datagrams, may be sent from a device in the network 120 to the gateway 115. The gateway 115 may format a Medium Access Control (MAC) frame in accordance with a physical layer definition for transmission to the satellite 105 via a downstream link 135. A variety of physical layer transmission modulation and coding techniques may be used with certain embodiments of the invention, including those defined with the DVB-S2 and WiMAX standards. In a number of embodiments, the gateway 115 utilizes ACM in conjunction with one or more of the traffic control and shaping techniques described herein to direct traffic to the individual terminals. The gateway 115 may use a broadcast signal, with a modulation and coding (modcode) format adapted for each packet to the link conditions of the terminal 130 or set of terminals 130 to which the packet is directed (e.g., to account for the variable service link 150 conditions from the satellite 105 to each respective terminal 130).

The gateway 115 may use an antenna 110 to transmit the signal to the satellite 105. In one embodiment, the antenna 110 is a parabolic reflector with high directivity in the direction of the satellite and low directivity in other directions. The downstream signals 135, 150 may include, for example, one (or more) single carrier signals. Each single carrier signal may be divided in time (e.g., using TDMA or other time-division multiplexing techniques) into a number of sub-channels. The sub-channels may be the same size, or different sizes, and a range of options will be addressed below. In some embodiments, other channelization schemes may be integrated with or used in place of time-divided sub-channels, such as Frequency Division Multiple Access (FDMA), Orthogonal Frequency Division Multiple Access (OFDMA), Code Division Multiple Access (CDMA), or any number of hybrid or other schemes known in the art.

In one embodiment, a geostationary satellite 105 is configured to receive the signals from the location of antenna 110 and within the frequency band and specific polarization transmitted. The satellite 105 may, for example, use a reflector antenna, lens antenna, array antenna, active antenna, or other mechanism known in the art for reception and/or transmission of signals. The satellite 105 may process the signals received from the gateway 115 and transmit the signal from the gateway 115 to one or more subscriber terminals 130. In one embodiment, the satellite 105 operates in a multi-beam mode, transmitting a number of narrow beams, each directed at a different region of the earth, allowing for frequency re-use. With such a multibeam satellite 105, there may be any number of different signal switching configurations on the satellite, allowing signals from a single gateway 115 to be switched between different spot beams. In one embodiment, the satellite 105 may be configured as a "bent pipe" satellite, wherein the satellite may frequency-convert the received carrier signals before retransmitting these signals to their destination, but otherwise perform little or no other processing on the contents of the signals. A variety of physical layer transmission modulation and coding techniques may be used by the satellite 105 in accordance with certain embodiments of the invention, including those defined with the DVB-S2 and WiMAX standards. For other embodiments, a number of configurations are possible (e.g., using LEO satellites, or using a mesh network instead of a star network), as evident to those skilled in the art.

The service signals transmitted from the satellite 105 may be received by one or more subscriber terminals 130, via the respective subscriber antenna 125. In one embodiment, the antenna 125 and terminal 130 together make up a very small aperture terminal (VSAT). In other embodiments, a variety of other types of antennas 125 may be used at the subscriber terminal 130 to receive the signal from the satellite 105. Each of the subscriber terminals 130 may be a single user terminal or, alternatively, be a hub or router (not pictured) that is coupled with multiple user terminals. Each subscriber terminal 130 may be connected to consumer premises equipment (CPE) 160 (e.g., computers, local area networks, Internet appliances, wireless networks, etc.).

In one embodiment, a Multi-Frequency Time-Division Multiple Access (MF-TDMA) scheme is used for upstream links 140, 145, allowing efficient streaming of traffic while maintaining flexibility in allocating capacity among each of the subscriber terminals 130. In this embodiment, a number of frequency channels are allocated which may be fixed, or which may be allocated in a more dynamic fashion. A Time Division Multiple Access (TDMA) scheme is then employed in each frequency channel. In this scheme, each frequency channel may be divided into several timeslots that can be assigned to a connection (i.e., a subscriber terminal 130). In other embodiments, one or more of the upstream links 140, 145 may be configured with other schemes, such as TDMA, FDMA, OFDMA, CDMA, or any number of hybrid or other schemes known in the art.

A subscriber terminal 130 may transmit information related to signal quality to the gateway 115 via the satellite 105. The signal quality may be a measured signal-to-noise ratio, an estimated signal-to-noise ratio, a bit error rate, a received power level, or any other communication link quality indicator. The subscriber terminal 130 itself may measure or estimate the signal quality, or it may pass information measured or estimated by other devices. A subscriber terminal 130 may also transmit data and information to a network 120 destination via the satellite 105 and gateway 115. The subscriber terminal 130 transmits the signals via the upstream uplink 145 to the satellite 105 using the antenna 125. A subscriber terminal 130 may transmit the signals according to a variety of physical layer transmission modulation and coding techniques, including those defined with the DVB-S2 and WiMAX standards. In various embodiments, the physical layer techniques may be the same for each of the links 135, 140, 145, 150, or may be different. The gateway 115 may, in some embodiments, use this signal quality information to implement Adaptive Coding and Modulation (ACM), adjusting the modcode formats to each terminal or set of terminals based on their link conditions.

Figure 2A:
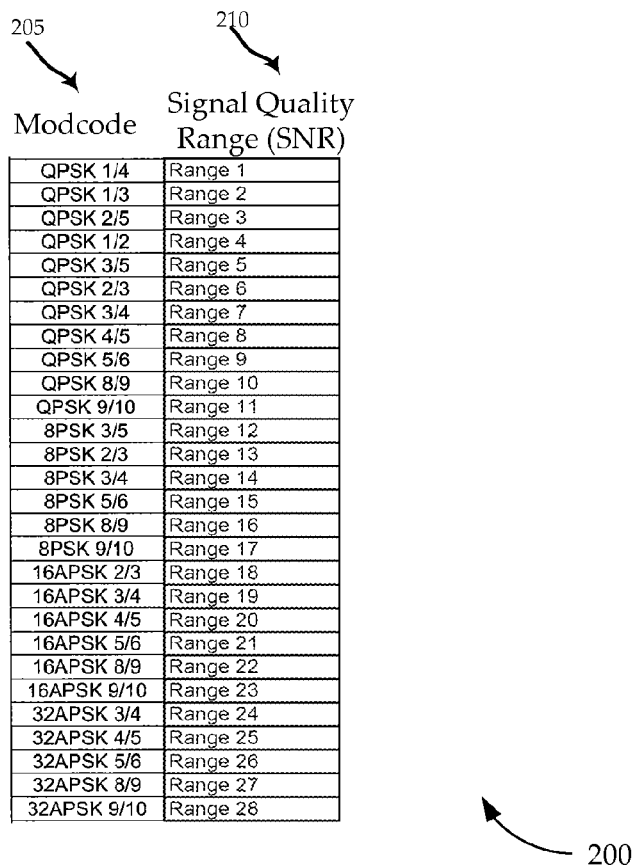
FIG. 2A illustrates an example of a modcode table that may be used to implement ACM according to various embodiments of the present invention.

Referring to FIG. 2A, an example of a modcode table 200 is illustrated in the form of a block diagram. This form of modcode table 200 may, for example, be used by a gateway 115 to determine the modcode to be used for packets destined for a subscriber terminal operating in a given signal quality range. The table contains a column listing a number of modcode formats 205. Each modcode format 205 corresponds to a specified signal quality range 210. Thus, using the signal quality attributed to a destination link for a packet, a signal quality range 210 encompassing the link may be identified, and the appropriate modcode may be selected. For example, if a destination link has a signal quality within Range 7, the modcode QPSK 3/4 may be used. In some embodiments, one or more of the ranges may include a reliability margin (which may be beneficial when channel conditions are changing rapidly, for example). One or more of the ranges may be modified dynamically to adjust this reliability margin as well.

In other embodiments, other signal quality indicators may be used, such as a measured SNR, an estimated SNR, a bit error rate, a received power level, or any other communication link quality indicator. It is also worth noting that a number of other data structures may also be used to relate signal quality ranges to modcodes. In one embodiment, each signal quality is associated with a different packet forwarding queue. In still other embodiments, other information density parameters in addition to modcode changes may be added to further adapt a signal to environmental or other conditions.

Figure 2B:
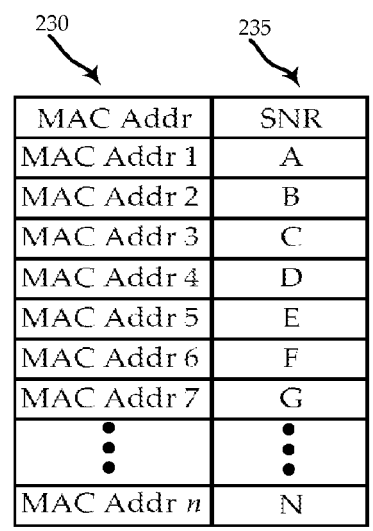
FIG. 2B illustrates an example of an address/SNR table that may be used to implement ACM according to various embodiments of the present invention.

Turning to FIG. 2B, an example of an address/SNR table 225 is illustrated in the form of a block diagram. This form of address/SNR table 225 may, for example, be used by a gateway 115 to look up the signal quality 235 of a subscriber terminal 130 to which a packet is destined, based on the destination address 230. The tables in FIGS. 2A and 2B may be embodied on one or more memories, which may be either on or off chip, and may be used in conjunction with one another to correlate a MAC address with a particular modcode format.

Although a destination MAC address is used in this example, other mechanisms may be used to identify particular subscriber terminals, including destination VLAN-ID, a Destination Internet Protocol ("DIP") address, a private addressing ID, or any other set of data comprising or otherwise correlated with a destination address. The data address may be parsed from a received data packet after arrival at a device, or it may be received in any other manner known in the art. It is also worth noting that a number of other data structures may also be used to relate an address to signal quality.

Once a modcode for a particular packet or packets is identified, for example using the modcode table 200, it may then be encapsulated, coded, mapped and transmitted in a variety of ways, as known in the art. One way to implement ACM is via the DVB-S2 standard, which specifically provides for its use. As noted above, ACM may change the modulation format and Forward Error Correction (FEC) codes ("modcodes") to best match the current link conditions. This adaptation may occur on a frame-by-frame basis. The discussion that follows assumes an IP-based packet network in the context of a DVB-S2 satellite transmission system, but the concepts may be applied for a variety of systems, including systems implementing DOCSIS or WiMax.

Referring next to FIG. 2C, an example of a timestamp modification table 250 is illustrated in the form of a block diagram. This table 250 may, for example, be used by a gateway 115 to determine an amount of timestamp modification, based on a variety of factors. The table 250 may be embodied on one or more memories. While a table 250 is used in one embodiment, a variety of other lookup mechanisms may be used.

The table 250 includes a column listing a number of different quality of service (QoS) designations 255 that each may have different timestamp modifications (X*, Y*, and/or Z*). The modifications for each QoS designation may be based on a range of factors. As used herein, QoS designations 255 include class of service designations, and any other form of prioritized or enhanced service requirements or privileges that may be associated with a data packet or other set of data. QoS designations 255 may include, but are not limited to, various resource reservation control mechanisms. QoS designations 255 may provide different priorities to different users or data flows, or guarantee a certain level of performance to a data flow in accordance with requests from the application program or the internet service provider policy. Different QoS designations 255 may include generic categories (e.g., best effort, controlled load, multimedia, voice, and control), or may be more specific (e.g., designated on a per application basis).

The QoS designation 255 may be included in a field in the particular data packet at issue (e.g., in data link layer header or internet protocol header). Alternatively, a type field in a data packet may be used to look up an associated QoS designation (e.g., via a table which associates various packets types with different QoS designations). A variety of techniques may be used to associate a given data packet or set of data with different quality of service designations.

For each QoS designation (A-K) 255 in this embodiment, there may be various modifications to a timestamp. A timestamp modification may be a set amount of time, may change depending on delay or latency, or may otherwise vary (e.g., with relatively greater changes as the delay or latency increases). The table 255 illustrates an example of how such modifications may be implemented. One factor that may be used to apply a modification to a timestamp is the delay 260 from the originating transmission to reception at the gateway. Thus, for a given delay, each QoS designation may have a different modification ($X_A$, $X_B$ . . . $X_K$), or have none at all (e.g., QoS designations E and J)). Another factor that may be used to determine an amount of a modification to a timestamp is the latency 265 at the gateway 115. In this embodiment, for a given latency, each QoS designation may have a uniform modification ($Y_N$), or none at all (e.g., with QoS designations A-D). Yet another factor that may be used to apply a modification to a timestamp is the load 270 at the gateway (perhaps averaged over a time period). For a given load, each QoS designation may have a different modification ($Z_A$, $Z_B$ . . . $Z_K$). In other embodiments, other schemes are possible, and the foregoing is for purposes of example only.

Other modification factors may be used, as well. For example, other age-based and delay-based modifications may be made. Moreover, the gateway 115 may receive information on delays or latency on the downstream links or nodes, and modify the timestamp modifications accordingly. The gateway 115 may also assess the QoS characteristics of other data packets waiting to be transmitted, and perform modification based on relative importance. Therefore, those skilled in the art recognize that a gateway 115 may look at delays and latency before, during, and after receiving the data packets at the gateway, and use timestamp modification to expedite or delay certain traffic.

Figure 3:
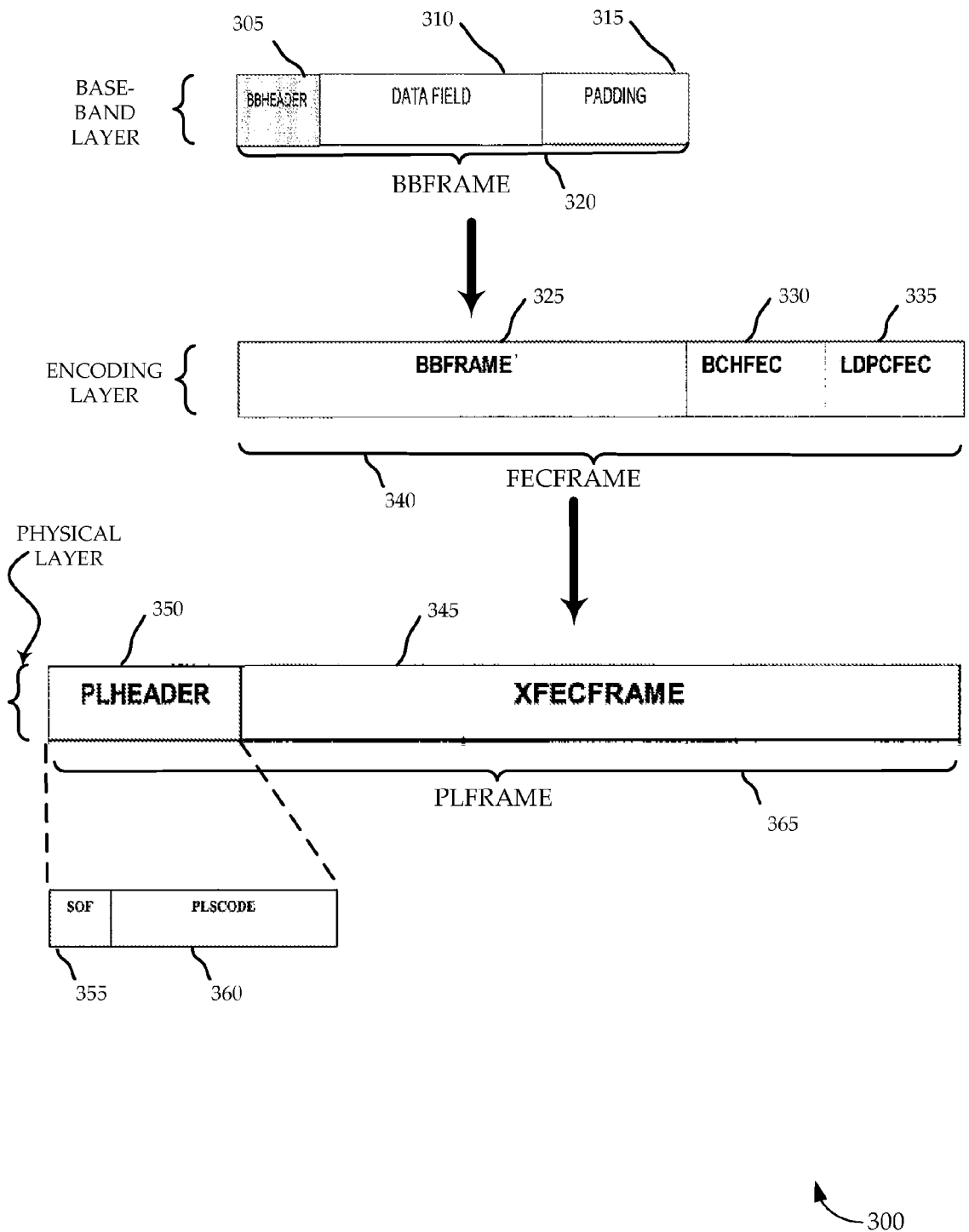
FIG. 3 is a simplified block diagram illustrating a DVB-S2 framing format that may be used to implement ACM according to various embodiments of the present invention.

Turning to FIG. 3, the framing format 300 for a frame of a DVB-S2 system is set forth to illustrate various aspects of the invention. In one embodiment, each frame is broadcast to all terminals 130, but is only directed at a select subscriber terminal 130 (or small groups of terminals 130). For example, the waveform may be a single carrier waveform transmitted downstream from a gateway 115 to a subscriber terminal 130 in the system 100 of FIG. 1. As noted above, while the DVB-S2 system is used as an example, the principles specified herein are applicable to a range of systems. Therefore, while the discussion that follows assumes an IP based packet network in the context of a DVB-S2 satellite transmission system, the concepts may be applied for a variety of systems, including systems implementing DOCSIS or WiMax.

In this embodiment, a base-band frame 320 is made up of a base-band header 305, a data field 310, and padding 315. Data in the data field may include one or more IP packets encapsulated in a MAC (or other) frame, or may include other types of data as well. Timestamps may be modified (e.g., via modification based on QoS designation as set forth above) to change the ordering in which received IP packets are encapsulated in base-band frame(s) 320. The data field may include addressing information (e.g., IP address, MAC address, etc.) indicating the terminal or terminals to which the packet will be directed. In some embodiments, IP packets associated with different modcodes may be transmitted in the same base-band frame 320, according to the lower order modcode. The DVB-S2 specification provides that certain frames will be of fixed size regardless of the modcode used (i.e., a normal FEC frame is 64,800 bits, and a shortened FEC frame is 16,200 bits). Therefore, instead of simply padding a frame when there is additional space available and no other remaining packets associated with a current modcode, a data packet (or fragment thereof) associated with a higher order modcode may be inserted into the base-band frame. In one embodiment, the available space is filled with as many additional data packets as will fit without overflow.

Interleaving and FEC encoding (e.g., BCH and LDCP) may then be performed on the base-band frame 320 to produce an encoded base-band frame 325, with outer coding parity bits 330 and inner coding parity bits 335 appended, to produce a FEC Frame 340. While, as noted above, the DVB-S2 specification provides that the FEC frame 340 will be of fixed size, in other embodiments, the FEC frame 340 size may vary according to the modcode selected for the frame, to thereby produce, for example, frames of uniform duration in time.

The FEC frame 340 is bit mapped to the applicable constellation (e.g., QPSK, 8PSK, 16APSK, 32APSK), to produce a XFEC frame 345 made up of symbols representative of the frame contents. A PL header 350 is added to the XFEC frame 345, together forming the PL frame 365. The PL header 350 is made up of a start of frame (SOF) slot 355 of 26 symbols, and a modcode (MODCOD) slot 360 of 64 symbols specifying the modcode and size (i.e., whether normal or shortened FEC frame). The PL header 350 is encoded. The PL frame 365 is then baseband shaped and quadrature modulated, as well as amplified and upconverted to be transmitted downstream.

Figure 4:
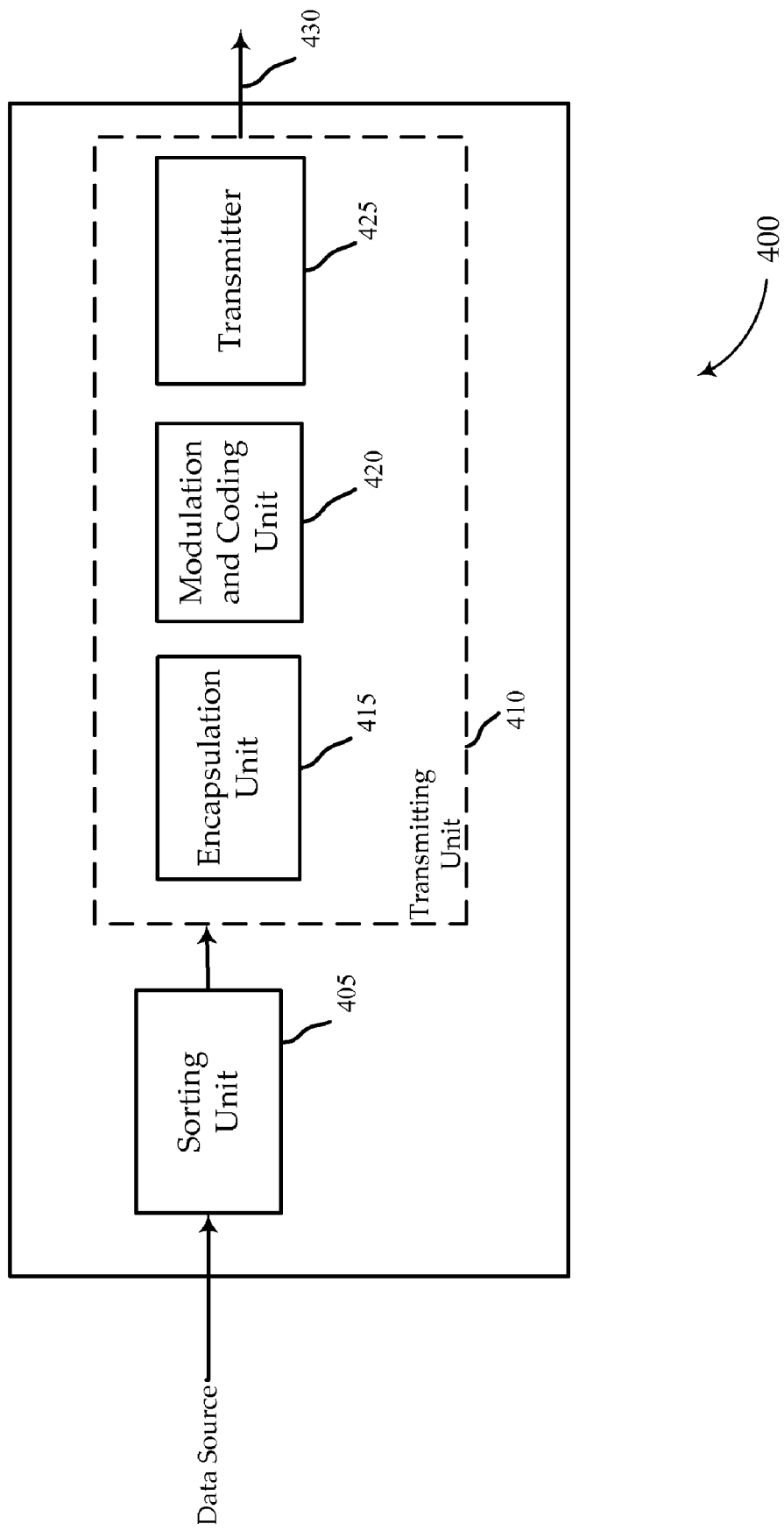
FIG. 4 is a simplified block diagram illustrating a communications device configured according to various embodiments of the present invention.

Referring to FIG. 4, a simplified block diagram illustrates an example of a device 400 configured according to various embodiments of the invention. In one embodiment, the device 400 is the gateway 115 of FIG. 1, transmitting packets downstream with modcodes adapted to the link to which the packets are directed. In other embodiments, the device 400 may be used in any number of different ACM implementations.

The device 400 in this embodiment includes a sorting unit 405 and a transmitting unit 410. In some embodiments, the transmitting unit 410 is made up of an encapsulation unit 415, a modulation and coding unit 420, and a transmitter 425. These components (405, 410, 415, 420, and 425) may be implemented, in whole or in part, in hardware. Thus, they may comprise one, or more, Application Specific Integrated Circuits (ASICs) adapted to perform a subset of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. Each may also be implemented, in whole or in part, with instructions embodied in a computer-readable medium, formatted to be executed by one or more general or application specific processors. Thus, the device 400 may include different types and configurations of memory (not shown), which may be integrated into the hardware or may be one or more separate components.

For purposes of discussion, assume that the device 400 is a gateway 115 within the system 100 of FIG. 1. In one embodiment, the system 100 is implemented in a star configuration where each terminal 130 communicates with the device 400, receiving a wide band broadcast signal and searching the waveform for data destined for that terminal 130. Each terminal 130 estimates the SNR of the received signal, although in other embodiments, different signal quality metrics may be used. This information is included in the return path, which may be established via a satellite link or some other means. In other embodiments, the device 400 may receive the link signal quality data from other sources as well. The device 400 then has an SNR estimate for each terminal (e.g., the address/SNR table 225 of FIG. 2B), and may organize this data on one or more memories, which may be implemented in hardware, in a separate computer readable medium, or external to the device 400.

Turning now to the packet flow, before being received by the device 400, a data packet may travel through a QoS router (not shown), which may append several fields of information data packet. These fields may include the MAC address of the destination terminal, a QoS designation, and a counter field. Alternatively, this functionality may be integrated into the device (e.g., in the sorting unit 405), as well.

The sorting unit 405 is configured to dynamically assign a different modcode to each data packet after each packet is received by the device. This assignment is based at least in part on a signal quality of a link to which the respective packet is destined. The sorting unit 405 is configured to use the MAC address, in conjunction with the SNR estimate, to identify a modcode to use to communicate with a terminal 130. To do so, the sorting unit 405 may produce or otherwise access a modcode table 200, or other mechanism which correlates certain SNR estimate ranges with different modcodes.

The sorting unit 405 is configured to assign a timestamp to each data packet as each packet is received by the device. In addition, the sorting unit is configured to modify the timestamp based on the QoS designation associated with each received packet (in other embodiments, the timestamp may be assigned by the QoS router, and merely modified by the sorting unit 405). This modification may performed by identifying a QoS designation associated with the data packet, and accessing table 250 of FIG. 2C to determine the applicable modification.

In one embodiment, a modcode and first timestamp are assigned to a data packet destined for a link within a given signal quality range associated with a modcode. A later arriving data packet is also destined for a link within the given signal quality range, but is associated with a higher quality of service designation than the first data packet. A second timestamp, modified to include an earlier arrival time than the first timestamp, is assigned to the second data packet. The amount of modification may, for example, be based on quality of service designation, latency at the device 400, delay between an originating transmission and receipt at the device 400, load at the device 400, or other age or latency based issues. By changing the timestamp, the order in which the packets are encapsulated and/or transmitted may be modified to account for different QoS designations.

A transmitting unit 410, directly or indirectly connected with the sorting unit 405, is configured to transmit the sorted packets according to a defined order of progression, and to produce a broadcast signal output 430. In one embodiment, the defined order of progression entails transmitting each received data packet associated with a first modcode (perhaps in sequence from oldest to youngest according to timestamp), before incrementing to a next higher order modcode and transmitting each received data packet associated with a next higher order modcode (perhaps in sequence from oldest to youngest according to timestamp), and incrementing accordingly to the highest order modcode. The process is then repeated beginning from the lowest order modcode. Note, however, that the term "defined order of progression" may include any packet forwarding selection or flow control algorithm known in the art. For example, a defined order of progression may encompass any of the number of queueing schemes that may order and format packets for forwarding based on modcode, destination address, order received, age, etc.

In one embodiment, the defined order of progression is interrupted upon expiration of a timer (hereinafter "interrupt timer"), and an out of order packet exceeding a threshold age is identified. The interrupt timer interval in one embodiment is 10 mS, but a variety of other intervals are possible. For each 10 mS time interval, several frames may be built, and the real time required to transmit these frames will be tracked. This may be accomplished by totaling the number of symbols required to transmit the physical layer frames. Once enough frames have been created such that more than 10 mS of time is required to transmit them, the timer expires. The timer may be varied depending upon the composition of traffic and various latency or delay characteristics. A number of other timer calculations are possible, as evident to those skilled in the art.

In one embodiment, the packet identified after timer expiration is the oldest received packet not yet transmitted (i.e., the threshold age is the age of the second oldest packet). The identified packet is then transmitted, and the defined order of progression may be restarted from the oldest packet. In another embodiment, all packets above a second threshold age are sent before the order of progression is restarted. The timestamps may be modified to be the oldest age, or simply be above the second threshold age.

In some embodiments, modcodes for data packets may be changed by the sorting unit 405 to expedite encapsulation and transmission. For example, if there are a number of control packets (e.g., as indicated by their QoS designations) that need to be broadcast immediately to subscriber terminals with diverse signal qualities, modcodes could be changed to group the packets together for expedited transmission.

The device 400 may control other flow modifications when the identified oldest packet is above certain threshold ages (as measured by the original, or modified, timestamp). For example, if the identified packet exceeds a first threshold age (e.g., 50 mS), the sorting unit 405 may be further configured to allow data packets associated with a threshold QoS designation to enter, while blocking others. If the identified packet exceeds a second threshold age (e.g., 80 mS), the sorting unit 405 may be further configured to block all incoming packets until another period of the timer expires. In another embodiment, the transmitting unit 410 is further configured to vary the period of the timer based at least in part on changes in the age of the identified oldest packet (e.g., decreasing the period of the timer if the age of the oldest packet increases). While these changes may be associated with the age of the oldest identified packet (e.g., measured by the difference between timestamp and transmission), other latency and traffic flow measurements may be used to modify these parameters. It is worth noting that timestamp modifications may be implemented to take into account possible secondary filtering effects.

In another embodiment, the sorting unit 405 is configured to vary a signal quality range associated with one or more modcodes to modify a reliability margin data for packets destined for a link within the varied signal quality range. For example, the sorting unit may be configured to increase the reliability margin when traffic is light, and decrease the reliability margin when traffic is heavy. This adjustment may, for example, be made based on the age of the oldest packet identified at the expiration of the timer (e.g., if T0>60 mS, set margin to 1 dB; if 60 mS>T0≧40 mS, set margin to 2 dB; if 40 mS>T0, set margin to 3 dB).

In some embodiments, the defined order of progression may include having the sorting unit 405 configured to group data packets associated with different modcodes for encapsulation in one frame to be transmitted according to a lowest order modcode of the different modcodes, the grouping to occur when there are no other remaining data packets that are associated with the lowest order modcode. For example, when there is additional space available in a base-band frame 320 and no other remaining packets are associated with a current modcode, a data packet (or fragment thereof) associated with a next higher order modcode may be inserted into the base-band frame 320.

To fill the additional space, a higher order packet may be fragmented, for example, into a first fragment and a second fragment. In such an embodiment, the first fragment may be sized to fill the available space, and transmitted in the first frame according to the lower order modcode. The second fragment may then be transmitted in a following frame according to the higher modcode.

In such embodiments, the transmitting unit 410 may include an encapsulation unit 415. The encapsulation unit 415 may be configured to encapsulate in a frame (e.g., a single base-band frame 320) one or more packets associated with a lower order modcode and one or more additional packets associated with a higher order modcode. The transmitting unit 410 also includes a modulation and coding unit 420 configured to encode and map the frame according to the lower order modcode (e.g., to produce XFEC frame 345). A transmitter 425 may baseband shape and quadrature modulate the frame, as well as amplify and upconvert the signal, to produce a broadcast signal output 430.

Figure 5:
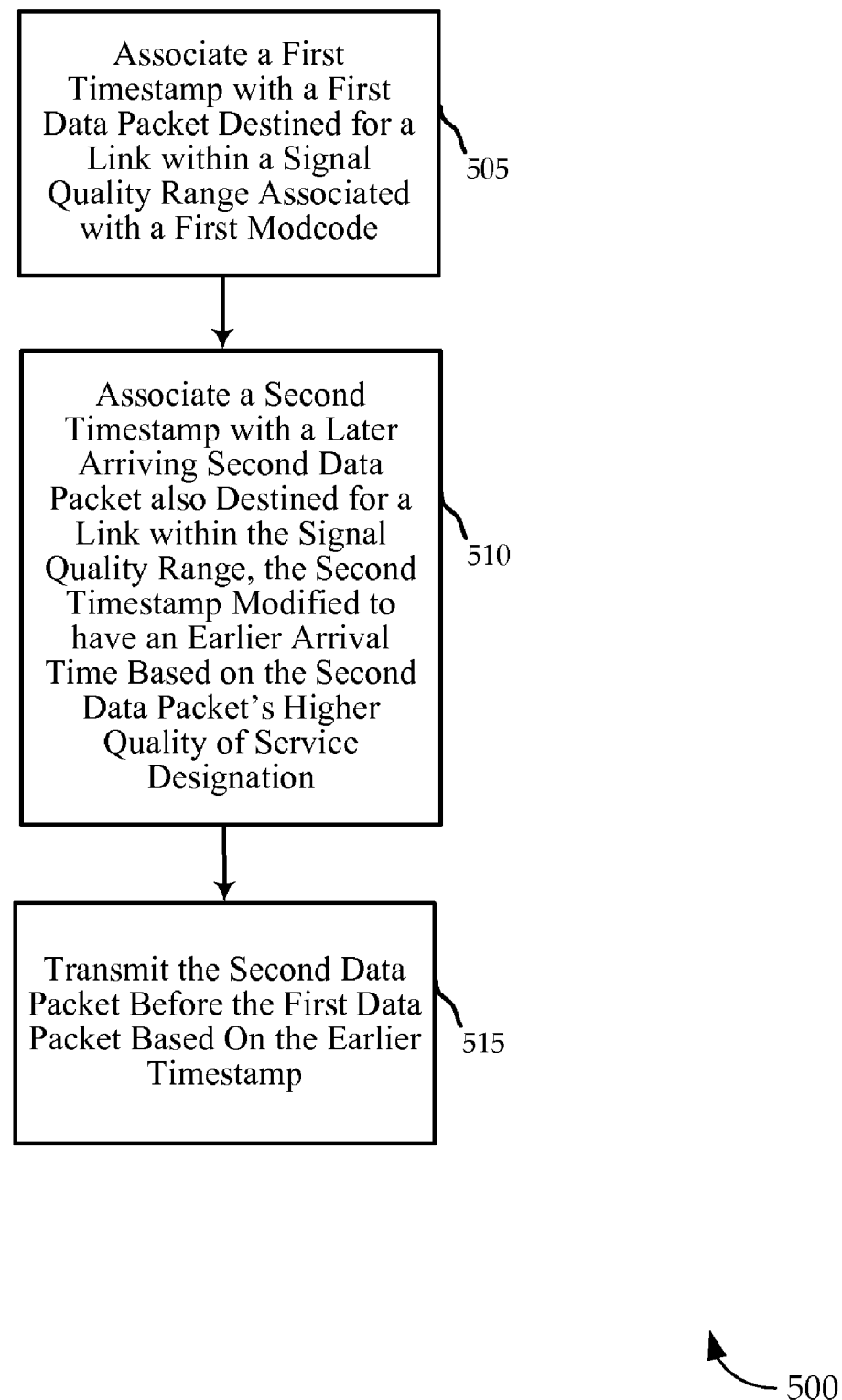
FIG. 5 is a flowchart illustrating a method of timestamp modification to various embodiments of the present invention.

FIG. 5 is a flowchart illustrating a process 500 of implementing adaptive coding and modulation in a broadcast signal. The process may be performed, for example, in whole or in part by the device 400 of FIG. 4. At block 505, a first timestamp is associated with a first data packet destined for a link within a signal quality range associated with a first modcode. At block 510, a second timestamp is associated with a later arriving second data packet also destined for a link within the signal quality range. The second timestamp is a modified timestamp, modified to have an earlier arrival time than the first based on the second data packet's higher quality of service designation. At block 515, the second data packet is transmitted before the first data packet based on the earlier timestamp.

Figure 6:
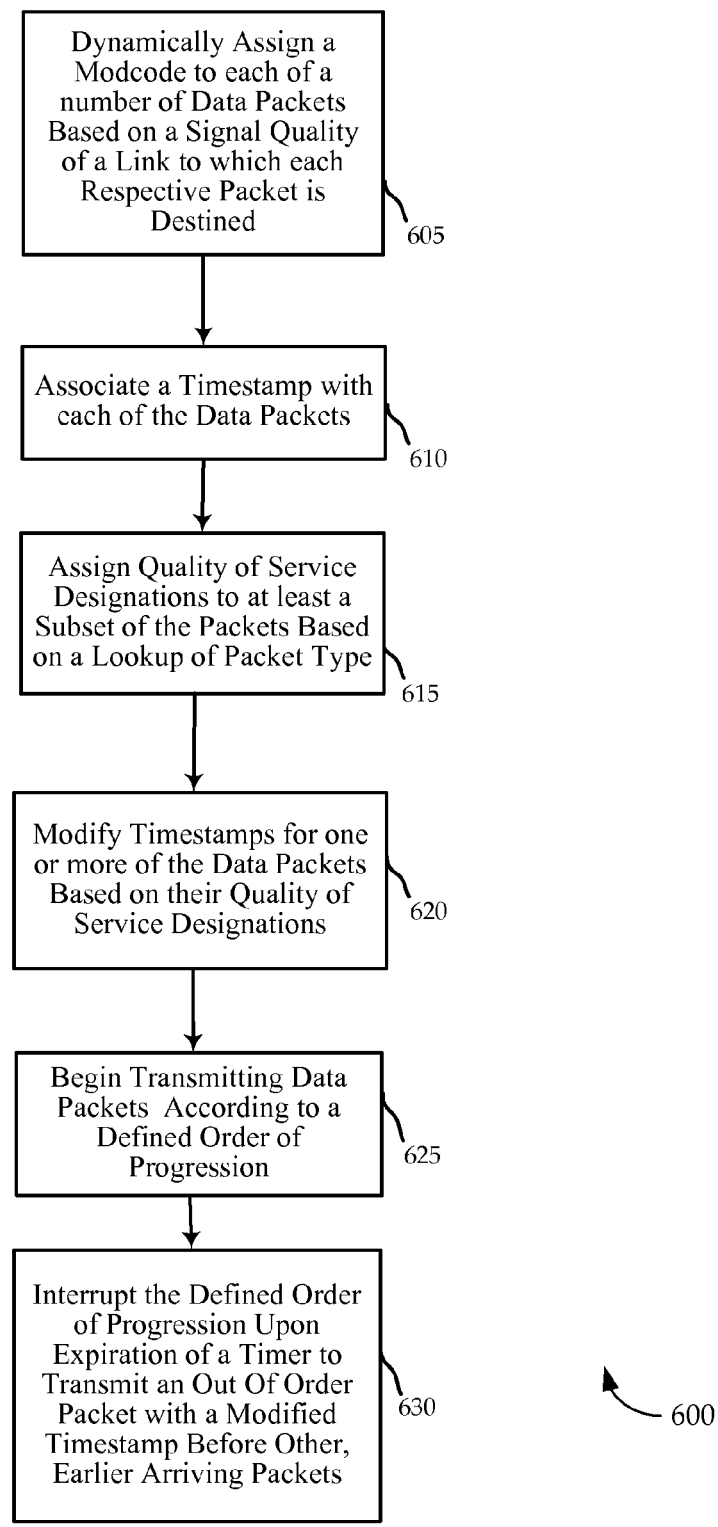
FIG. 6 is a flowchart illustrating a method of timestamp modification and quality of service designation according to various embodiments of the present invention.

FIG. 6 is a flowchart illustrating a process 600 for controlling the flow of data traffic in a broadcast signal implementing adaptive coding and modulation. The process may be performed, for example, in whole or in part by the device 400 of FIG. 4. At block 605, modcodes are dynamically assigned to each of a number of data packets based on the signal quality of the link to which each respective packet is destined. At block 610, a timestamp is associated with each of the data packets. At block 615, quality of service designations are identified for at least a subset of the data packets based on a lookup of packet type. At block 620, timestamps for one or more of the data packets are modified based on their quality of service designations. At block 625, data packets are transmitted according to a defined order of progression. At block 630, the defined order of progression is interrupted upon expiration of a timer to transmit an out of order packet with a modified timestamp before other, earlier arriving packets.

Figure 7:
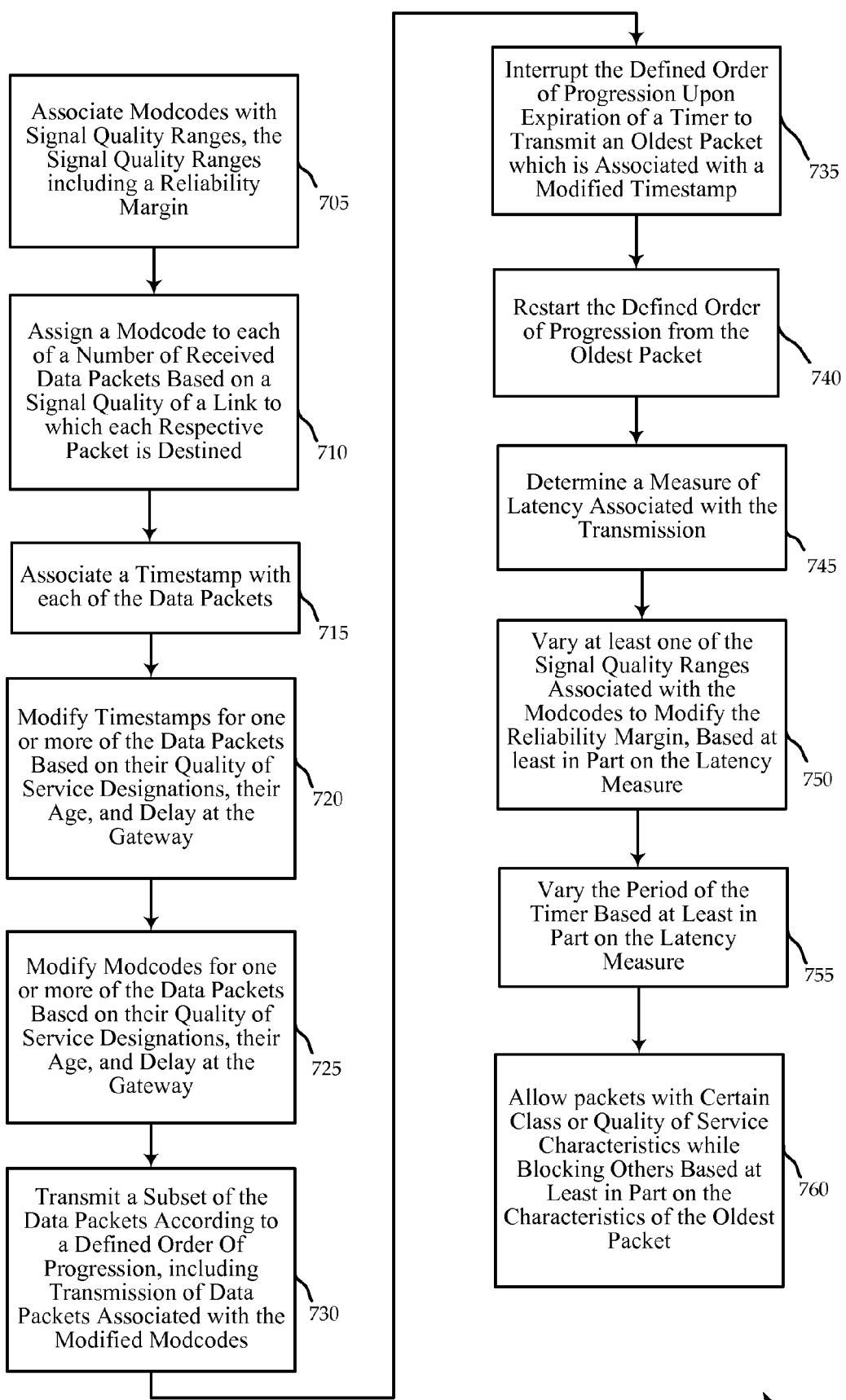
FIG. 7 is a flowchart illustrating a method of timestamp modification and quality of service prioritization according to various embodiments of the present invention.

FIG. 7 is a flowchart illustrating a process 700 for controlling the flow of data traffic in a broadcast signal implementing adaptive coding and modulation. The process may be performed, for example, in whole or in part by the device 400 of FIG. 4. At block 705, different modcodes are each associated with signal quality ranges, the signal quality ranges including a reliability margin. At block 710, modcodes are assigned to each of a number of received data packets based on a signal quality of the link to which each respective packet is destined.

At block 715, a timestamp is associated with each of the data packets. At block 720, the timestamps are modified for one or more of the data packets, based on one or more of their quality of service designation, their age, and delay at the device 400. At block 725, modcodes for one or more of the data packets are modified based on one or more of their QoS designations, their age, and delay at the device 400.

At block 730, a subset of the data packets is transmitted according to a defined order of progression, including transmission of data packets associated with the modified modcodes. In one embodiment, the data packets associated with the modified modcodes are sent before earlier arriving data packets with unmodified modcodes. At block 735, the defined order of progression is interrupted upon expiration of a timer to transmit an oldest packet associated with a modified timestamp. At block 740, the defined order of progression is restarted from the oldest packet. At block 745, a latency measurement is associated with transmission at the device 400. At least one of the signal quality ranges associated with the modcodes is varied, at block 750, to modify the reliability margin based at least in part on the latency measure (e.g., if there is increased latency, the reliability margin may be reduced). At block 755, the period of the interruption timer is varied based at least in part on the latency measure. At block 760, packets with certain class or quality of service characteristics are allowed, while others are blocked, based at least in part on the characteristics of the oldest packet.

Figure 8:
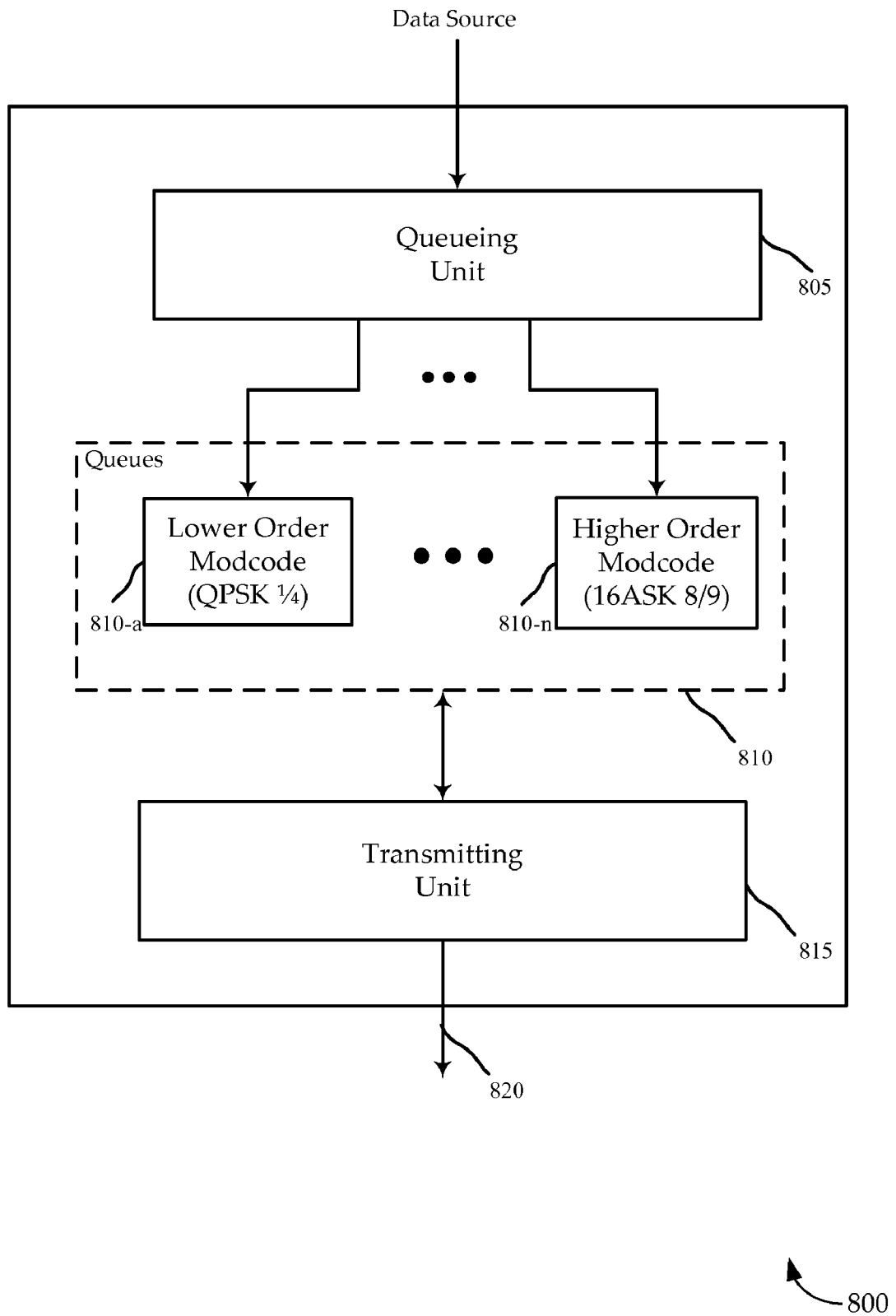
FIG. 8 is a simplified block diagram illustrating a device including a queueing unit configured according to various embodiments of the present invention.

Referring next to FIG. 8, a simplified block diagram illustrates an example of a queueing device 800 configured to queue and transmit packets according to their modcode. The queueing device 800, in one embodiment, may be the device 400 described in relation to FIG. 4, implementing adaptive modulation and coding utilizing the queueing process described below.

The queueing device 800 in this embodiment includes a queueing unit 805, a number of packet forwarding queues 810, and a transmitting unit 815. These components (805, 810, and 815) may be in communication with one another, and may be implemented, in whole or in part, in hardware. Thus, they may make up one, or more, Application Specific Integrated Circuits (ASICs) adapted to perform a subset of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. Each may also be implemented, in whole or in part, with instructions embodied in a computer-readable medium, formatted to be executed by one or more general or application specific processors. The queues 810 may be embodied on one or more memories, which may be either on or off chip.

For purposes of discussion, assume that the queueing device 800 of FIG. 8 is a gateway 115 within the system 100 of FIG. 1. The queueing device 800 of FIG. 8 is also an embodiment of the device 400 of FIG. 4, wherein the sorting unit 405 of FIG. 4 is implemented as the queueing unit 805 of FIG. 8. In other embodiments, the device 800 may be used in any number of different ACM implementations.

The queueing device 800 may be implemented as a gateway in a star configuration where each terminal 130 is in communication with the queueing device 800, receiving a wide band broadcast signal and searching the waveform for data destined for that terminal 130. Each terminal 130 may estimate the signal quality of the service link using any one of a variety of metrics, and transmit the estimate to the queueing device 800 via the return path. In other embodiments, the queueing device 800 may receive the link signal quality data from other sources as well. The device 800 then has a receive signal estimate for each terminal (e.g., the address/SNR table 225 of FIG. 2B), and may organize this data on one or more memories, which may be implemented in hardware, in a separate computer readable medium, or external to the device 800.

Turning now to the packet flow, a data packet from a data source may be received by the queueing device 800. The queueing device 800 includes a number of individual packet forwarding queues 810, each assigned a different modcode and associated with a select one of a number of signal quality ranges. After entering the device 800, each respective packet is received by a queueing unit 805, and assigned or otherwise associated with a timestamp. The timestamping may be performed when a packet is received by the device, or at other processing stages. The timestamp may, therefore, be used to determine the age of a given packet for various purposes. The timestamp may be used by other components of the queueing device 800 to determine latency associated with a particular packet or packets at different stages of processing (i.e., latency from receipt at the device 800 to transmission, latency within the queueing unit 805, etc.).

The queueing unit 805 is also configured modify the timestamp based on the QoS designation associated with each received packet. This modification may be performed by identifying a QoS designation associated with the data packet, and performing a lookup or accessing a table (e.g., table 250 of FIG. 2C) to determine the applicable modification. The amount of modification may, for example, may be based on a QoS designation, latency at the device 800, delay between an originating transmission and receipt at the device 800, load at the device 800, or any other age, latency, traffic shaping or other issues described herein.

The queueing unit 805 is also configured to place the packet into a select one of the packet forwarding queues 810 (e.g., in order of timestamp). The particular queue selected is based on its association with a signal quality range encompassing a signal quality of a link to which the respective packet is destined. To make this assignment, the queueing unit 805 may produce or otherwise access a modcode table (e.g., modcode table 200 of FIG. 2A), or other mechanisms which correlate certain signal quality estimate ranges with different modcodes. Note that modcodes may be modified to expedite or delay data packets by changing their queues. (It is worth noting that, in some embodiments, the sorting unit 405 of FIG. 4 may be implemented as the queueing unit 805 of FIG. 8).

A transmitting unit 815, directly or indirectly connected with the packet forwarding queues 810, is configured to transmit the packets according to a defined order of progression, and to produce a broadcast signal output 820. In one embodiment, the defined order of progression entails transmitting each received data packet in a given forwarding queue associated with a first modcode (e.g., in sequence from oldest to youngest), before incrementing to the queue 810 associated with the next higher order modcode and transmitting each received data packet associated with a next higher order modcode (again, perhaps in sequence from oldest to youngest), and incrementing accordingly to the queue 810 with the highest order modcode. Once the queue with the highest order modcode is emptied, the process is then repeated beginning from the queue 810 associated with the lowest order modcode. Note that, in one embodiment, the defined order of progression may provide for transmitting at least one data packet from a first selected queue and a data packet or fragment from a second selected queue in a single frame according to lower order modcode. For example, when there is additional space available in a base-band frame 320 and no other remaining packets are associated with a current modcode, a data packet (or fragment thereof) associated with a next higher order modcode may be inserted into the base-band frame 320. Note, also, that the term "defined order of progression" may include any of a number of queueing schemes that may order and format packets for forwarding based on modcode, destination address, order received, age, etc.

The defined order of progression is interrupted upon expiration of a timer (hereinafter "interrupt timer"), and a packet exceeding a threshold age and from an out of order queue 810 is identified. In one embodiment, the identified packet is the oldest received packet not yet transmitted (e.g., the threshold age is the second oldest packet). The identified packet is then transmitted, and the defined order of progression may be restarted from the transmitted packet. Note that in one embodiment, the defined order of progression may provide for transmitting at least one data packet from the first selected queue and the data packet from the second selected queue in a single frame according to the first modcode Turning to FIG. 9, a flow diagram illustrates an example decision flow 900 for a device, such as the queueing device 800 of FIG. 8. At block 902, assume that the process begins upon the expiration of a timer (e.g., the interrupt timer discussed above). The timer then restarts. In this embodiment, there is a table in which MAC addresses of the destination terminals are associated with the queues 810 (e.g., by using the tables 200, 225). At block 904, these tables are updated with revised SNR information from the terminals. Incoming data packets are associated with timestamps (modified or otherwise) at block 906. The modification may be made according to a QoS designation (e.g., by referring to table 250 of FIG. 2C). At block 908, allowed packets are placed into respective queues 810, based on the destination terminal SNR and the signal ranges applicable to the queues 810, and ordered according to timestamp. The queue 810 with the oldest packet, and the age of that packet, are identified at block 910. These first blocks in FIG. 9 (902, 904, 906, 908, 910) may be initiated together at on or about the same time.

The reliability margin calculations for each modcode queue 810 may then be revised, at block 912, based on the age of the oldest packet. Also, the blocking rules may be modified, at block 914, also based on the age of the oldest packet.

These revisions will be implemented, at block 916, upon the expiration of the timer. In other embodiments, the period of the timer may be modified based on the age of the oldest packet, as well.

At block 918, the oldest packet (or fragment thereof) is moved from the identified queue 810 to the payload portion of a frame, for example, a base-band frame 320 for the DVB-S2 system. At block 920, a determination is made as to whether the frame is completed (e.g., a determination that there is no available space left in the frame). If the frame is complete, the frame is encapsulated and forwarded to the modulation and coding unit at block 922, where it is encoded and mapped accordingly. At block 924, a determination is made whether the frame includes a beginning of a fragment. If so, block 926 indicates that the next frame will begin with the remaining portion of the fragment to complete the packet (regardless of whether the timer expires in the interim). At block 928, a determination is made whether the timer has expired. If yes, at block 948 the process 900 is restarted, back to block 902.

Returning to block 920, if the determination is made that the frame is not complete, the frame may continue to be filled. Similarly, if the timer has not expired at block 928, a new frame may be constructed. In each case, a determination is made at block 930 regarding whether the last packet from a current queue 810 has been sent. If packets remain in the current queue 810, the process returns to block 918 to move the oldest packet from the current queue 810 to fill (or begin) the frame. However, if it is determined that no packets remain in the current queue 810, a frame may still be filled or constructed with a packet from a queue associated with a higher order queue.

Thus, at block 932, a determination is made whether all higher order queues are empty. If not, a current queue identifier increments, at block 934, to the next highest non-empty queue 810, and then returns to block 918 to move the oldest packet from the newly identified queue 810 to fill (or begin) the frame. When a frame is eventually completed and forwarded to the modulation and coding unit at block 922, and packets associated with different modcodes are in a single frame, the lowest order modcode associated with the packets of the frame is used. It will be evident to those skilled in the art how the process described may empty queues 810 to construct and fill frames, incrementing to next higher order non-empty queues 810 as current queues 810 are emptied.

Returning to block 932, if it is determined that there are no higher order queues with packets remaining, the frame is padded at block 936 (e.g., with the padding 315 of a DVB-S2 base-band frame 320). The frame is encapsulated and forwarded to the modulation and coding unit at block 938, where it is encoded and mapped accordingly. At block 940, a determination is made whether the timer has expired. If yes, the process 900 is restarted at block 948. If the timer has not expired, at block 942 a determination is made whether all lower order queues are empty. If not, the process decrements, at block 944, to the lowest order non-empty queue 810, and then returns to block 918 to move the oldest packet from that queue 810 to begin the next frame, with the process repeating in the manner described above from block 918.

Returning to block 942, if the determination is that all lower order queues are empty, an all pad frame is built at block 946. The process returns to block 938, where the all pad frame is encapsulated and forwarded to the modulation and coding unit, where it is encoded and mapped accordingly, and the process continues from there.

Figure 9:
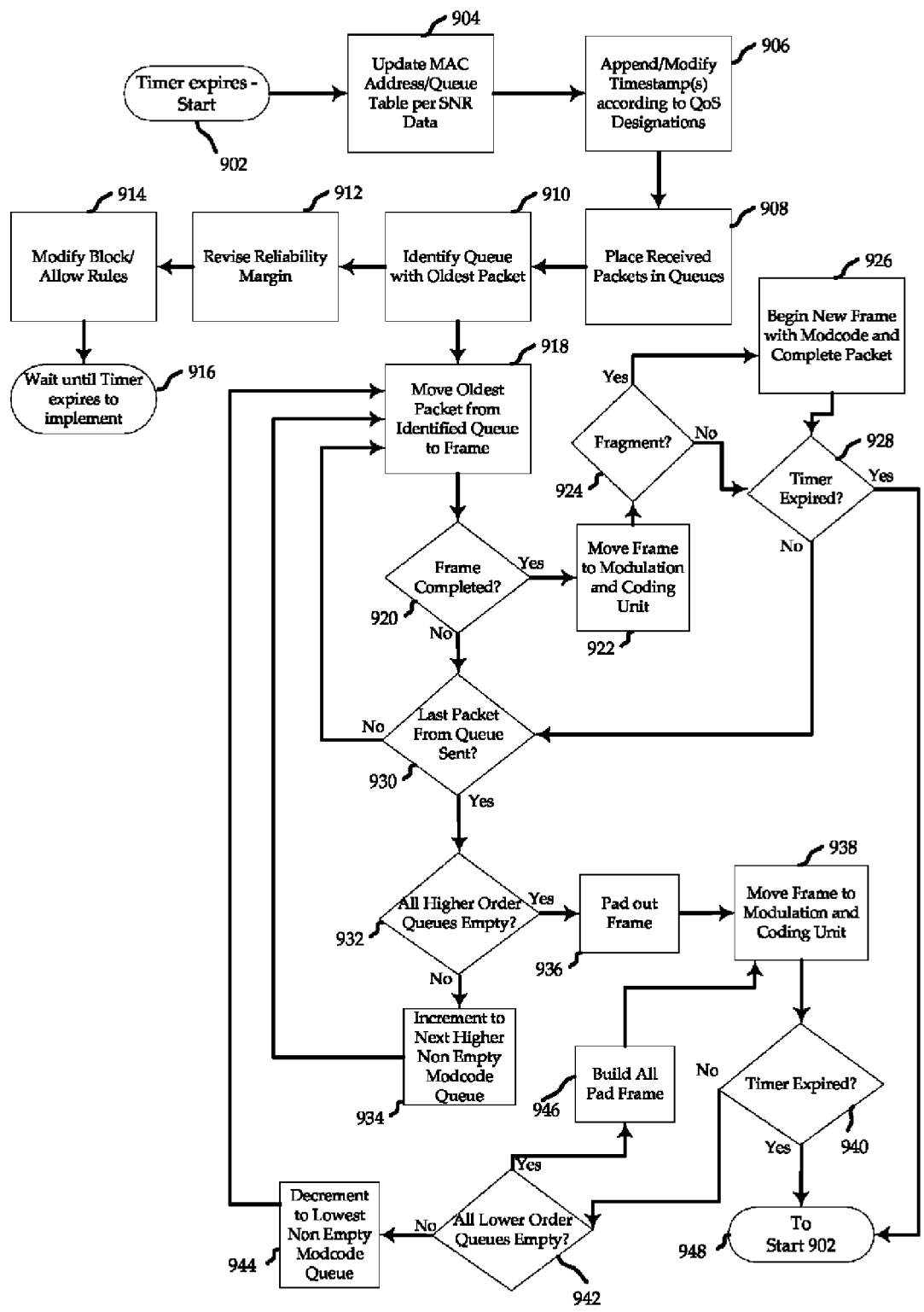
FIG. 9 is a flow diagram illustrating a queueing process according to various embodiments of the present invention.
Figure 10:
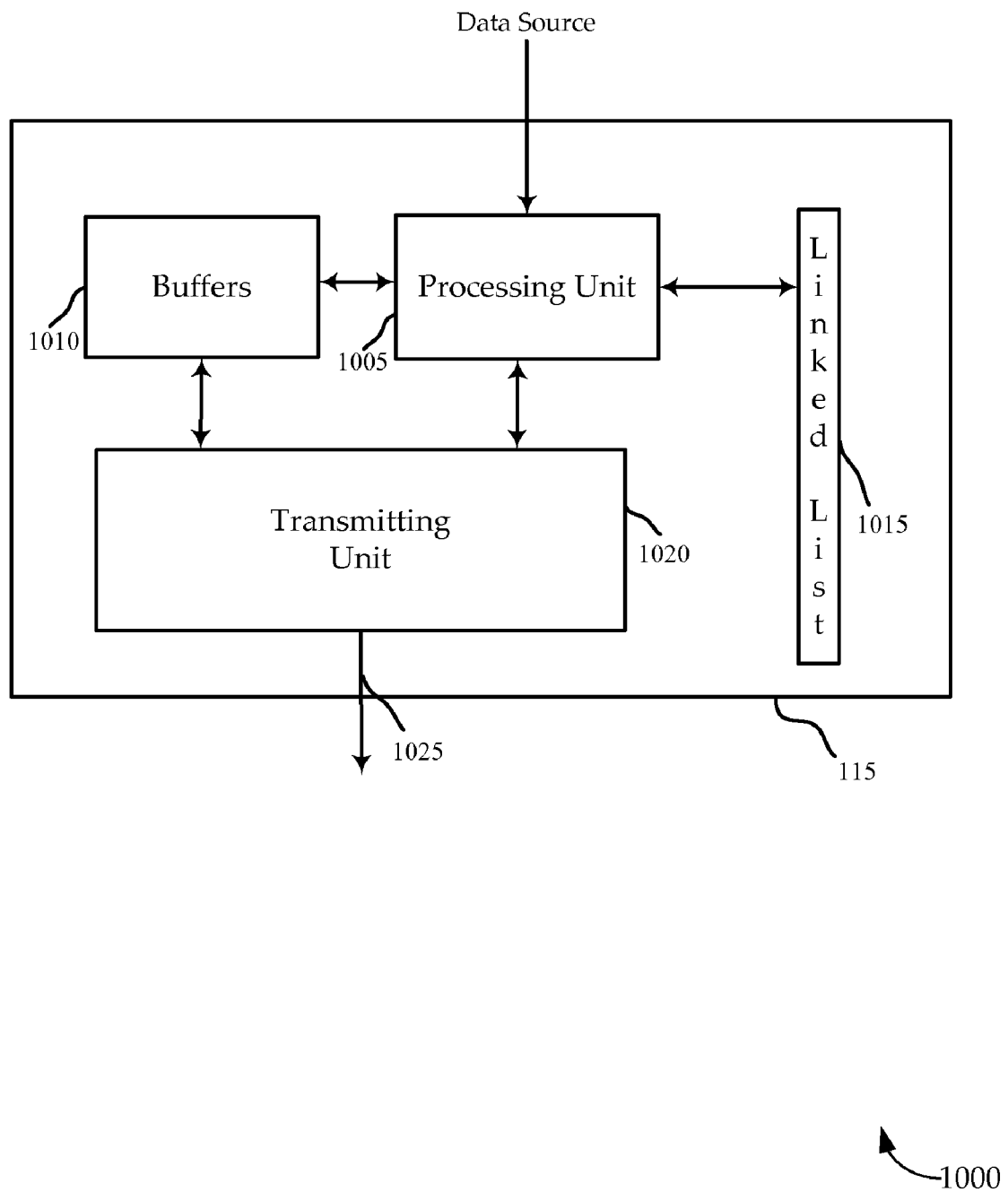
FIG. 10 is a simplified block diagram illustrating a communications device configured to use a linked list according to various embodiments of the present invention.

While FIGS. 8-9 illustrate a set of embodiments in which packet forwarding queues are used to implement various aspects of the invention, certain principles set forth may be applied using a variety of alternative data structures. Referring next to FIG. 10, a simplified block diagram illustrates an example of a traffic shaping device 1000 configured to utilize a linked list data structure to shape and control data traffic according to modcode in an ACM system. The traffic shaping device 1000, in one embodiment, may be the device 400 described in relation to FIG. 4, implementing adaptive modulation and coding utilizing a linked list in the manner described below.

The device 1000 in this embodiment includes a processing unit 1005, buffers 1010, a linked list 1015, and a transmitting unit 1020. These components (1005, 1010, 1015, and 1020) may be in communication with one another, and may be implemented, in whole or in part, in hardware. Thus, they may make up one, or more, Application Specific Integrated Circuits (ASICs) adapted to perform a subset of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. Each may also be implemented, in whole or in part, with instructions embodied in a computer-readable medium, formatted to be executed by one or more general or application specific processors. The buffers 1010 and linked list 1015 may be embodied on one or more memories, which may be either on or off chip.

For purposes of discussion, assume that the device 1000 of FIG. 10 is a gateway 115 within the system 100 of FIG. 1. The queueing device 1000 of FIG. 10 is also an embodiment of the device 400 of FIG. 4, wherein the sorting unit 405 of FIG. 4 is implemented as the processing unit 1005 of FIG. 10. In other embodiments, the device 1000 may be used in any number of different ACM implementations.

The device 1000 may be implemented as a gateway in a star configuration where each terminal 130 is in communication with the queueing device 800, receiving a wide band broadcast signal and searching the waveform for data destined for that terminal 130. As noted in regard to other embodiments, each terminal 130 may measure the signal quality of the service link using any one of a variety of metrics, and transmit the measurement to the traffic shaping device 1000 via the return path. In other embodiments the device 1000 may receive the link signal quality data from other sources as well. The traffic shaping device 1000 may then have a receive signal measurement from each terminal (e.g., the address/SNR table 225 of FIG. 2B), and may organize this data on one or more memories, which may be implemented in hardware, in a separate computer-readable medium, or external to the device 1000.

Turning now to the packet flow, before being received by the device 1000, a data packet may travel from a data source through a QoS router (not shown), which may append several fields of information data packet. These fields may include the QoS information for the packet and address information of the destination terminal. This functionality may be integrated into the device 1000, as well (e.g., at the processing unit 1005).

After entering the device 1000, each respective packet is received by a processing unit 1005, and assigned or otherwise associated with a timestamp. The timestamping may be performed when a packet is received by the device, or at other processing stages. The timestamp may, therefore, be used to determine the age of a given packet for various purposes. The timestamp may be a modified timestamp, the modification based on QoS designation or any of the other factors discussed herein related to timestamp modification. The timestamp may be used by other components of the device 1000 to determine latency associated with a particular packet or packets at different stages of processing (i.e., latency from receipt at the device 1000 to transmission, latency within the processing unit 1005, etc.).

The processing unit 1005 may store received data packets (and any appended data, such as timestamps) in the buffers 1010. The processing unit 1005 also inserts a new element associated with the buffered data packet in a linked list 1015, which will be used to shape the traffic as it is transmitted from the device 1000.

The linked list may be structured in a variety of ways, as known in the art, and the following explanation illustrates only a subset of the implementations possible. In one embodiment, the linked list may be characterized as a data structure made up of a sequence of elements, each element containing one (or more) field for data, and also containing two pointers linking the element to the next and previous elements. In one embodiment, the data in each element is made up of a token or other pointer referencing the buffered data packet (and any appended data) which the element represents. In other embodiments, the token or other pointer may reference a table which includes certain portions of the information from the buffered packet and other sources. For example, the token or other pointer may directly or indirectly reference the modcode and address/SNR tables 200, 225 in FIGS. 2A and 2B. There are thus a variety of ways in which the one (or more) data field from an element may be associated with the buffered data packet (and any appended data) which the element represents.

As noted, the linked list 1015 may be characterized as a data structure made up of a sequence of elements, each element containing a field (or fields) for data, and also containing pointers linking the element to the next and previous elements. In one embodiment, the linked list is a circularly linked list, where the last element in the list is linked back to the first. For ease in discussing the following embodiment, the "top" of the list will hereinafter be referred to as part of the list holding the element associated with the oldest packet (based on timestamp) remaining to be forwarded, while the "bottom" of the list will hereinafter be referred to as the part of the list holding the element associated with the newest packet (based on timestamp) remaining to be forwarded. As data packets are received, their associated elements are inserted into the list based on their timestamps to thereby construct the list. Elements associated with the youngest timestamps will be put at the bottom of the list, while elements associated with older timestamps (e.g., timestamps modified based on QoS designation) will be placed into the list based on relative timestamps.

Note that while in other embodiments packet forwarding queues may be used to shape and control traffic, a different though related mechanism may be used in the following embodiments. For example, instead of having modcodes related to queues, consider an embodiment wherein each of a number of modcodes is related to signal quality ranges (without also necessarily being related to queues). This relation could be embodied on one or more memories, which may be either on or off chip. This relation may, for example, be the table 200 of FIG. 2A. However, there are a variety of ways in which signal qualities ranges may be related to modcodes. Note, also, that there may more than one range related to each modcode, and the ranges may be of any size.

As noted above, when data packets are received by the traffic shaping device 1000, the processing unit 1005 may store received data packets (and any appended data) in the buffers 1010. The processing unit 1005 also inserts a new element associated with the buffered data packet in the linked list 1015 (the particular placement location in the linked list based at least in part on timestamp). The processing unit 1005 may then identify a signal quality range associated with a given modcode. Identified items in the list will be removed in some embodiments, so that the top of the list will identify the oldest packets to be transmitted, and the linked list will proceed to the bottom in chronological order. The processing unit 1005 will then iterate through the linked list 1015 to identify elements associated with data packets destined for links within the identified signal quality range. Once the bottom of the list is reached, the processing unit 1005 may circle to the top of the linked list 1015, and iterate through to identify elements associated with links within a second signal quality range assigned to the next higher order modcode. This process may be repeated to identify elements associated with packets for incrementing higher modcodes. Once the signal quality range associated with the highest order modcode is emptied, the process is then repeated beginning from the signal quality range associated with the lowest order modcode. This order of progression is merely one example of many, but will be used for much of the discussion below.

The transmitting unit 1020 is configured to access or otherwise receive the buffered data packets. The transmitting unit 1020 may transmit the packets in an order corresponding to a sequence in which their associated elements are identified, and according to the modcode assigned to the identified signal quality range. In one embodiment, the transmitting unit 410 of FIG. 4 is the transmitting unit 1020 of FIG. 10. Once data is transmitted (or perhaps upon confirmation of receipt), the memory (e.g., buffers 1010) for the transmitted packet may be allocated as available.

The processing unit 1005 may be configured to identify packets according to a defined order of progression. Also, the transmitting unit 1020 may be configured to transmit the packets according to the defined order of progression, and to produce a broadcast signal output 1025. In one embodiment, the defined order of progression includes identifying and transmitting received data packets in a given signal quality range associated with a first modcode (e.g., in sequence from oldest to youngest), before identifying and transmitting each received data packet associated with a next higher order modcode (again, perhaps in sequence from oldest to youngest), and incrementing accordingly to the highest order modcode. Once the packets associated with highest order modcode are identified, the process may then be repeated beginning from the identified packets from the lowest order modcode.

Note that in one embodiment, the defined order of progression may provide for transmitting at least one data packet within a first signal quality range assigned a first modcode and a data packet or fragment from a second signal quality range assigned a second modcode in a single frame according the lower order modcode. For example, when there is additional space available in a base-band frame 320 and no other remaining packets are associated with a current modcode, a data packet (or fragment thereof) associated with a next higher order modcode may be inserted into the base-band frame 320. Note, also, that the term "defined order of progression" includes any of a number of schemes that may order and format packets for forwarding based on modcode, destination address, order received, age, etc.

In one embodiment, the defined order of progression is interrupted upon expiration of a timer (hereinafter "interrupt timer"), and a packet exceeding a threshold age is identified. In one embodiment, the identified packet is the oldest received packet not yet transmitted (i.e., it is the packet from the top of the list). The identified packet is then transmitted, and the defined order of progression may be restarted from the transmitted packet (i.e., the "current" signal quality range will become the signal quality range of the identified packet, and the iteration through the list will continue).

Figure 11A:
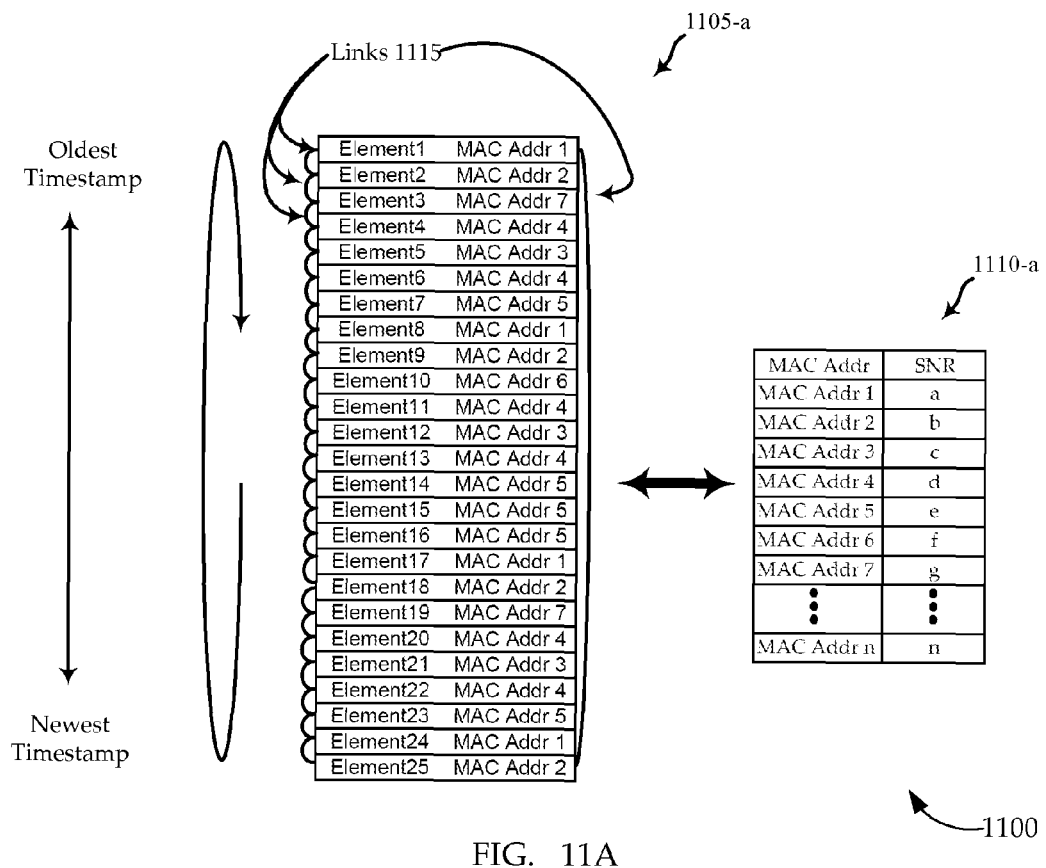
FIGS. 11A and 11B are block diagrams illustrating use of a linked list according to various embodiments of the present invention.

Turning to FIG. 11A, a block diagram 1100 illustrating a simplified example of an ACM implementation using a linked list is shown. The block diagram illustrates how a linked list 1105 may be used to control the flow of traffic. The linked list 1105 of FIG. 11A may be the linked list 1015 of FIG. 10. In this embodiment, the linked list 1105 is a data structure made up of a sequence of elements (or nodes), each element containing one (or more) fields for data, and also containing two pointers linking the element to the next and previous elements. The pointers linking each element to the next and previous elements are shown as links 1115. While the elements 1-25 in FIG. 11A are shown as being adjacent to one another, they may in fact occupy very diverse regions of memory, as is evident to those skilled in the art. In one embodiment, the data in each element is made up of a token or other pointer referencing a buffered data packet (and any appended data) which the element represents. In other embodiments, the token or other pointer may indirectly reference a table which includes certain portions of the information from the buffered packet and other sources. For example, in this embodiment a table 1110 is indirectly connected to linked list 1105, and the table 1110 shows the SNR estimate for the link associated with a variety of MAC addresses.

In this embodiment, the linked list 1105 is a circularly linked list, where the last element in the list is linked back to the first. For ease in discussing the following embodiment, the "top" of the list will be referred to as part of the list holding the element associated with the oldest packet (according to timestamp) remaining to be forwarded, while the "bottom" of the list will be referred to as the part of the list holding the element associated with the newest packet (according to timestamp) remaining to be forwarded. As data packets are received, their associated elements are inserted into the list, to thereby construct the list. Elements associated with the newest timestamps will be put at the bottom of the list, while elements associated with older timestamps (e.g., timestamps modified based on QoS designation) will be placed into the list based on relative timestamps. As packets are identified for transmission, their associated elements are removed from the list.

FIG. 11A illustrates the list at first time ($T_1$). Assume that in this embodiment, a first signal quality range includes SNR "a", but no other SNRs are in the range. For each element, the device 1000 may identify the MAC address of the element, and then access the table 1110-a to determine if the element is associated with a MAC address in the range. The device 1000 iterates through the linked list 1105-a from elements 1-25, identifying and removing elements 1, 8, 17, and 24, because these elements are associated with SNRs within the range. A second signal quality range associated with the next higher modcode includes SNR "g", with no other SNRs that are in the range. For each remaining element, the device 1000 may identify the MAC address of the element, and then access the table 1110-a to determine if the element is associated with a MAC address in the range. The device 1000 iterates through the linked list 1105, identifying and removing elements 3 and 19, because these elements are associated with SNRs within the second range. The packets associated with elements 1, 8, and 17 are transmitted in a first frame according to the modcode assigned to the first signal quality range. However, because there is space in the DVB-S2 base-band frame 320, packets associated with elements 24 and 3 are transmitted in a second frame according to the modcode assigned to the first signal quality range. The packet associated with element 19 is transmitted in a third frame according to the higher order modcode assigned to the second signal quality range.

Figure 11B:
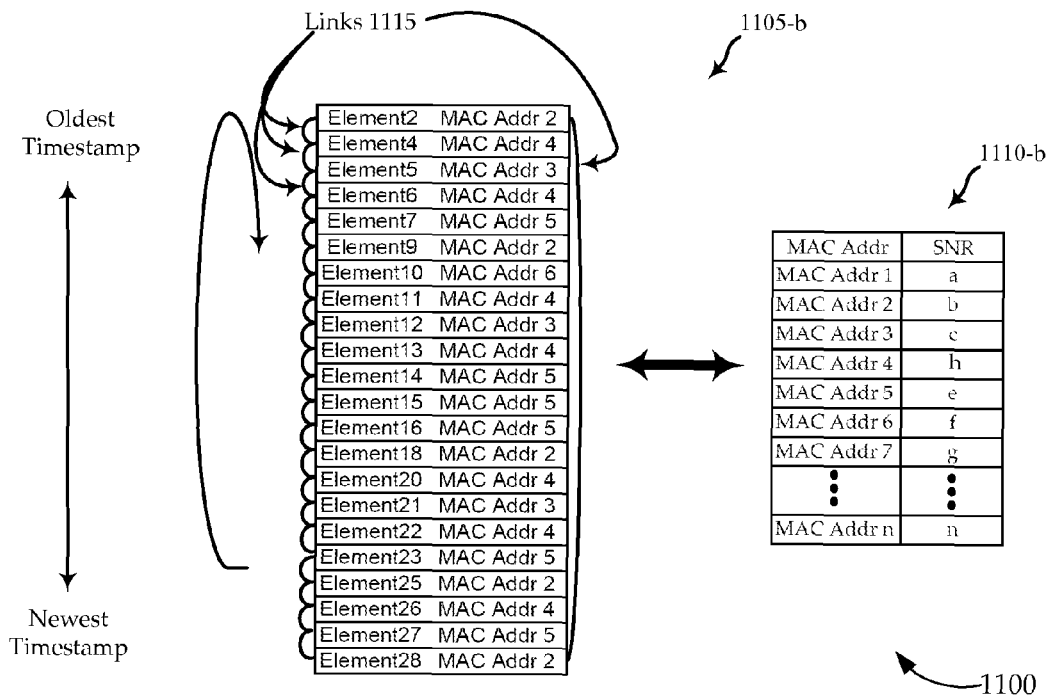

FIG. 11B shows the linked list 1105-b at a second time ($T_2$) after the device has iterated through elements 1-25, then through 2-7, 9-16, and 18-23, at which time the timer expires. As is evident, elements 1, 3, 8, 17, 19, and 24 have been removed from the linked list 1105-b, and new elements 26-28 have been added, and the elements that remain are linked from oldest at the top to newest at the bottom. In this embodiment, element 26 is the last arriving packet, but its timestamp was modified according to QoS designation, and therefore it was inserted into the list above the bottom (note, however, that depending on the amount of modification, it could have been inserted anywhere in the list). However, instead of iterating though elements 25-28, the device 1000 will go to the top of the linked list to identify the element associated with the oldest timestamp (element 2) because of the expiration of the timer. The device will identify the signal quality range of this identified element, and iterate from element 2 down through the list, identifying other elements associated with packets in this range. Also note that with the expiration of the timer, the table 1110-b is updated, and there is a new SNR for MAC address 4. The foregoing example is used only to illustrate a simplified example of how a linked list may be used in various embodiments of the invention.

Figure 12:
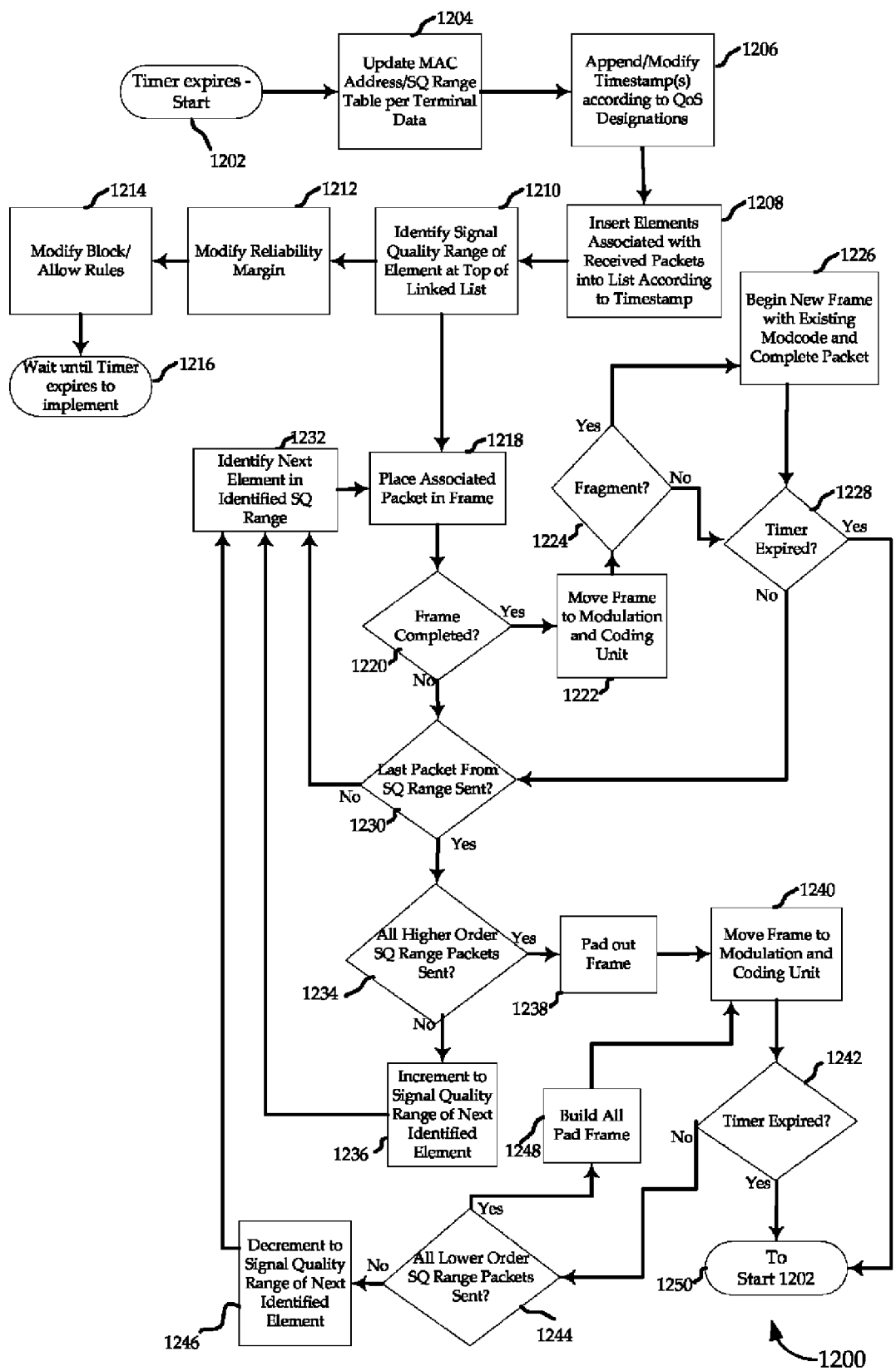
FIG. 12 is a flow diagram illustrating a flow control process using a linked list according to various embodiments of the present invention.

Turning to FIG. 12, a flow diagram illustrates an example decision flow 1200 for a device, such as the traffic shaping device 1000 of FIG. 10. Assume a linked list, such as the linked list 1105 of FIG. 11A or 11B, is ordered chronologically with the oldest elements at the top of the list. At block 1202, assume that the process begins upon the expiration of a timer (e.g., the interrupt timer). The timer then restarts. In this embodiment, different SNR ranges are associated with different modcodes. Also, there is a table in which MAC addresses of the destination terminals are associated SNRs 1110. At block 1204, these tables are updated with revised SNR information from the terminals. Incoming data packets are associated with timestamps (modified or otherwise) at block 1206. The modification may be made according to a quality of service designation (e.g., by referring to table 250 of FIG. 2C). At block 1208, packets are associated with elements, and the elements are inserted into the linked list according to the relative order of their timestamps. At block 1210, the signal quality range encompassing the signal quality for the link of the data packet associated with the element at the top of the list is identified. These first blocks in FIG. 12 (1202, 1204, 1206, 1208, 1210) may be initiated together at on or about the same time.

The reliability margin calculations for each modcode may then be revised, at block 1212, based on the age of the packet at the top of the list (e.g., by varying the signal quality range associated with the modcode). Also, the blocking rules may be modified at block 1214, also based on the age of the packet at the top of the list (i.e., the oldest packet). These revisions will be implemented at block 1216, upon the expiration of the timer. In other embodiments, the period of the timer may be modified based on the age of the oldest packet, as well. Note, also, that in other embodiments, other latency or flow measurements may be used to adjust the reliability margin, filtering rules, or period of the timer.

At block 1218, the packet (or fragment thereof) associated with the element from the top of the list is moved from the buffer to the payload portion of a frame, for example, a base-band frame 320 for the DVB-S2 system. The element may then be removed from the top of the list. At block 1220, a determination is made as to whether the frame is completed (e.g., a determination that there is no available space left in the frame). If the frame is complete, the frame is encapsulated and forwarded to the modulation and coding unit at block 1222, where it is encoded and mapped accordingly. At block 1224, a determination is made whether the frame includes a beginning of a fragment. If so, block 1226 indicates that the next frame will begin with the remaining portion of the fragment to complete the packet (regardless of whether timer the expires in interim). At block 1228, a determination is made whether the timer has expired. If yes, at block 1250 the process 1200 is restarted, back to block 1202.

Returning to block 1220, if the determination is made that the frame is not complete, the frame may continue to be filled. Similarly, if the timer has not expired at block 1228, a new frame may be constructed. In each case, a determination is made at block 1230 regarding whether the last packet from the current signal quality range has been sent. This is accomplished by iterating down through the elements of the linked list and checking whether the SNRs of each associated data packet fall with the current range. If so, the next applicable element down the list is identified at block 1232, and the process returns to block 1218 to move the packet associated with the element from the buffers to fill (or begin) the frame. However, if it is determined that no packets remain in the current signal quality range (i.e., the bottom of the linked list is reached), a frame may still be filled or constructed with a packet from a queue associated with a higher order queue.

Thus, at block 1234, a determination is made whether other elements are associated with any signal quality ranges assigned to higher order modcodes are empty. This is accomplished by circling to the top of the list and iterating through the list to determine if there are elements associated with the signal quality range assigned to the next higher modcode, and continuing this circling. If there is an element associated with a higher order modcode, a signal quality range increments, at block 1236, to the signal quality range of that element, and then returns to blocks 1232 and 1234 to identify the element and move the associated packet from the buffer to fill (or begin) the frame. When a frame is eventually completed and forwarded to the modulation and coding unit at block 1222, and packets associated with different modcodes are in a single frame, the lowest order modcode associated with the packets of the frame is used. It will be evident to those skilled in the art how the process described may identify the packets from a signal quality range assigned to a modcode to construct and fill frames, and then circle to the top of a list to identify packets from the signal quality range associated with the next higher modcode.

Returning to block 1234, if it is determined that there are no elements associated with higher order modcodes, the frame is padded at block 1238 (e.g., with the padding 315 of a DVB-S2 base-band frame 320). The frame is encapsulated and forwarded to the modulation and coding unit at block 1240, where it is encoded and mapped accordingly. At block 1242, a determination is made whether the timer has expired. If yes, the process 1200 is restarted at block 1250. If the timer has not expired, at block 1244, a determination is made whether any elements associated with packets assigned to lower order modcodes remain in the linked list. This is accomplished by circling to the top of the linked list and iterating through the list to determine if there are elements associated with the signal quality range assigned to the lowest order modcode, and continuing this circling. If such an element is found, the process decrements, at block 1246, to the signal quality range of that element, then returns to blocks 1232 and 1234 to identify the element and move the associated packet from the buffer to begin the frame, with the process moving forward from that point.

Returning to block 1244, if a determination is made that no elements associated with packets assigned to lower order modcodes remain, an all pad frame is built at block 1248. The process returns to block 1240, where the all pad frame is encapsulated and forwarded to the modulation and coding unit, where it is encoded and mapped accordingly, and the process continues from there.

It should again be noted that the methods, systems and devices discussed above are intended merely to be exemplary in nature. It must be stressed that various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flowchart or a flow diagram. Although they may describe the operations as a sequential process, many of the operations can be performed in parallel or concurrently. In addition, the order of the operations may be rearranged. A process is terminated when its operations are completed, but could have additional steps not included in the figure.

Moreover, as disclosed herein, the term "memory" may represent one or more devices or components thereof for storing data, including read only memory (ROM), random access memory (RAM), magnetic RAM, core memory, magnetic disk storage mediums, optical storage mediums, flash memory devices or other computer-readable mediums for storing information. The term "computer-readable medium" includes, but is not limited to, portable or fixed storage devices, optical storage devices, wireless channels, a sim card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be required before the above elements are considered. Accordingly, the above description should not be taken as limiting the scope of the invention.

What is claimed is:

1. A device for implementing adaptive coding and modulation in a satellite communications system, the device comprising:
   a sorting unit configured to:
      associate a first modcode and first timestamp with a first data packet, the first data packet destined for a link within a first signal quality range associated with the first modcode;
      associate the first modcode with a second data packet destined for a link within the first signal quality range, the second data packet associated with a higher quality of service designation than the first data packet; and
      associate, with the second data packet, a second timestamp modified to include an earlier arrival time than the first timestamp, the timestamp modification based at least in part on the higher quality of service designation; and
   a transmitter unit, communicatively coupled with the sorting unit, and configured to transmit the second data packet before the first data packet is transmitted, the earlier transmission based at least in part on the earlier timestamp.

2. The device of claim 1, wherein the sorting unit is further configured to:
   determine an amount of modification for the second timestamp based at least in part on the higher quality of service designation.

3. The device of claim 1, wherein the sorting unit is further configured to:
   determine an amount of modification for the second timestamp based at least in part on a latency determination for the device.

4. The device of claim 1, wherein the sorting unit is further configured to:
   determine an amount of modification for the second timestamp based at least in part on a delay between an originating transmission of the second packet and receipt of the second packet at the device.

5. The device of claim 1, wherein the sorting unit is further configured to:
   determine an amount of modification for the second timestamp based at least in part on a measured load for the device.

6. The device of claim 1, wherein the transmitter unit is further configured to:
   transmit additional data packets according to a defined order of progression; and
   interrupt the defined order of progression upon expiration of a timer to transmit an out of order packet exceeding a threshold age.

7. The device of claim 6, wherein the transmitter unit is further configured to:
   vary the period of the timer based at least in part on a delay associated with the additional data packets.

8. The device of claim 1, wherein the sorting unit is further configured to:
   place the first data packet in a first packet forwarding queue associated with the first signal quality range; and
   place the second data packet in the first packet forwarding queue in front of the first data packet based on the earlier, second timestamp.

9. The device of claim 1, wherein the sorting unit is further configured to:
   insert, in a linked list, a first element corresponding to the first data packet and the associated first signal quality range; and
   insert, in the linked list, a second element corresponding to the second data packet and the associated first signal quality, the second element inserted into the linked list in front of the first data packet based on the earlier, second timestamp.

10. The device of claim 1, wherein,
   the device comprises a gateway configured to transmit downstream traffic for a digital video broadcast system; and
   the first modcode is a selected one of a plurality of modcodes, each modcode of the plurality associated with a different signal quality range of a plurality of signal quality ranges.

11. The device of claim 1, wherein the sorting unit is further configured to:
   designate the second data packet with the higher quality of service designation using a quality of service lookup based on type of the second data packet.

12. The device of claim 1, wherein the sorting unit is further configured to:
   change the modcode associated with the second data packet from the first modcode to a second modcode to expedite transmission of the second data packet based at least in part on the higher quality of service designation.

13. The device of claim 1, wherein the higher quality of service designation comprises a class of service designation.

14. A method of implementing adaptive coding and modulation in a broadcast signal, the method comprising:
   receiving a first data packet destined for a link within a first signal quality range of a plurality of signal quality ranges;
   associating a first timestamp with the first data packet;
   receiving, after the reception of the first data packet, a second data packet destined for a link within the first signal quality range, the second data packet associated with a higher quality of service designation than the first data packet;
   associating, with the second data packet, a second timestamp modified to include an earlier arrival time than the first timestamp, the timestamp modification based at least in part on the higher quality of service designation; and
   encapsulating the second data packet in a first frame before the first data packet is encapsulated, the earlier encapsulation based at least in part on the earlier timestamp.

15. The method of claim 14, further comprising:
   transmitting the second data packet before the first data packet is transmitted, the earlier transmission based at least in part on the earlier arrival time for the second timestamp.

16. The method of claim 15, further comprising:
   determining an amount of modification for the second timestamp based at least in part on an estimated delay between the receipt and transmission of the second packet.

17. The method of claim 14, further comprising:
   determining an amount of modification for the second timestamp based at least in part on attributes of the higher quality of service designation.

18. The method of claim 14, further comprising:
determining an amount of modification for the second timestamp based at least in part on an age attributed to the second data packet.

19. The method of claim 14, further comprising:
determining an amount of modification for the second timestamp based at least in part on relative quality of service designations for other received data packets buffered waiting to be transmitted.

20. The method of claim 14, further comprising:
transmitting additional data packets according to a defined order of progression; and
interrupting the defined order of progression upon expiration of a timer to transmit the second data packet based on a determination that the second timestamp exceeds a threshold age.

21. The method of claim 20, further comprising:
varying the period of the timer based at least in part on a delay associated with the additional data packets.

22. The method of claim 14, further comprising:
placing the first data packet in a first packet forwarding queue associated with the first signal quality range; and
placing the second data packet in the first packet forwarding queue in front of the first data packet based on the earlier, second timestamp.

23. The method of claim 14, further comprising:
changing the modcode associated with the second data packet from the first modcode to a second modcode to expedite transmission of the second data packet based at least in part on the higher quality of service designation.

24. A system for implementing adaptive coding and modulation, the system comprising:
a gateway configured to:
associate a first timestamp with a data packet destined for a link within a first signal quality range associated with a first modcode;
associate a second timestamp with a second data packet received after the first data packet and destined for a link within the first signal quality range, the second timestamp modified to include an earlier arrival time than the first timestamp based at least in part on a higher quality of service designation for the second data packet; and
transmit the second data packet in a wireless signal to a satellite before the first data packet is transmitted, the earlier transmission based at least in part on the earlier timestamp;
the satellite, communicatively coupled with a subscriber terminal and the gateway, and configured to receive the wireless signal from the gateway and retransmit the received signal to the subscriber terminal; and
the subscriber terminal configured to receive the signal transmitted via the satellite.

* * * * *